United States Patent
Matsuzawa et al.

(10) Patent No.: US 9,257,147 B2
(45) Date of Patent: Feb. 9, 2016

(54) IMAGE PROCESSING APPARATUS AND IMAGE PROCESSING METHOD, AND RECORDING MEDIUM STORING IMAGE PROCESSING PROGRAM

(71) Applicants: Junji Matsuzawa, Kanagawa (JP); Satoki Ishii, Kanagawa (JP); Akiyoshi Sakakibara, Kanagawa (JP)

(72) Inventors: Junji Matsuzawa, Kanagawa (JP); Satoki Ishii, Kanagawa (JP); Akiyoshi Sakakibara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/552,953

(22) Filed: Nov. 25, 2014

(65) Prior Publication Data

US 2015/0146228 A1    May 28, 2015

(30) Foreign Application Priority Data

Nov. 25, 2013 (JP) ................ 2013-242576
Sep. 18, 2014 (JP) ................ 2014-189539

(51) Int. Cl.
G11B 27/036 (2006.01)
H04N 1/00 (2006.01)
G11B 20/10 (2006.01)

(52) U.S. Cl.
CPC .............. *G11B 27/036* (2013.01); *G11B 20/10* (2013.01); *H04N 1/0092* (2013.01); *H04N 2201/0094* (2013.01)

(58) Field of Classification Search
USPC ................. 358/1.15, 468, 400, 401; 348/241; 381/317
See application file for complete search history.

(56) References Cited

U.S. PATENT DOCUMENTS

| | | | |
|---|---|---|---|
| 2009/0141307 A1* | 6/2009 | Slijp et al. | 358/1.15 |
| 2010/0260354 A1* | 10/2010 | Ozawa | 381/94.4 |
| 2011/0187769 A1* | 8/2011 | Hiraide | 347/5 |
| 2013/0108175 A1* | 5/2013 | Ptucha | 382/199 |
| 2013/0154508 A1* | 6/2013 | Gilliom | 315/297 |
| 2013/0293747 A1* | 11/2013 | Yoshizuka et al. | 348/241 |
| 2015/0063465 A1* | 3/2015 | Hattori et al. | 375/240.25 |
| 2015/0087257 A1* | 3/2015 | Balram et al. | 455/404.1 |

FOREIGN PATENT DOCUMENTS

| | | |
|---|---|---|
| JP | 4-343561 | 11/1992 |
| JP | 9-284423 | 10/1997 |
| JP | 2002-218123 | 8/2002 |
| JP | 2003-046670 | 2/2003 |
| JP | 2003-333223 | 11/2003 |
| JP | 2005-184715 | 7/2005 |
| JP | 2006-262241 | 9/2006 |
| JP | 2008-306294 | 12/2008 |
| JP | 2009-200975 | 9/2009 |

* cited by examiner

*Primary Examiner* — Jerome Grant, II
(74) *Attorney, Agent, or Firm* — Oblon, McClelland, Maier & Neustadt, L.L.P.

(57) ABSTRACT

A novel image processing apparatus that provides effective digitized audio while ensuring audio clarity and outputs image data adding the digitized audio is provided. The image processing apparatus includes an audio recording unit that stores audio data based on input audio in an audio storage device, a data editing unit that adds the audio data to image data, control circuitry that instructs the recording unit to record when a predetermined recording condition is satisfied, and a data output unit to output the image data in an appropriate format. For example, the control circuitry considers a condition that the scanner scans the document set on a platen as the recording condition.

13 Claims, 18 Drawing Sheets

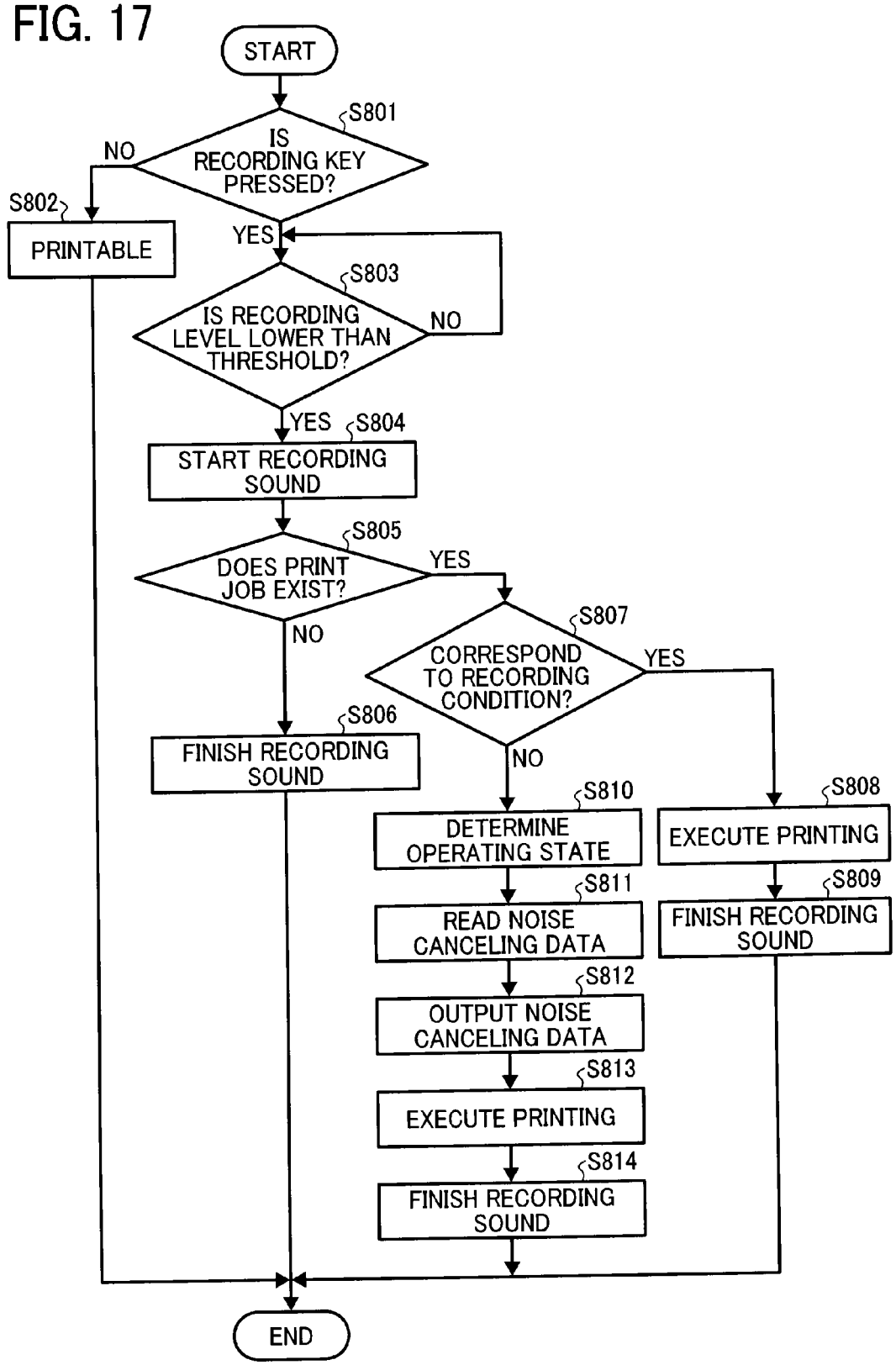

IMAGE PROCESSING APPARATUS AND IMAGE PROCESSING METHOD, AND RECORDING MEDIUM STORING IMAGE PROCESSING PROGRAM

CROSS-REFERENCE TO RELATED APPLICATIONS

This patent application is based on and claims priority pursuant to 35 U.S.C. §119(a) to Japanese Patent Applications No. 2013-242576, filed on Nov. 25, 2013 and No. 2014-189539, filed on Sep. 18, 2014 in the Japan Patent Office, the entire disclosure of which is hereby incorporated by reference herein.

BACKGROUND

1. Technical Field

The present invention relates to an image processing apparatus, an image processing method, and a non-transitory recording medium storing an image processing program.

2. Background Art

There are image processing apparatuses that digitize audio using an audio input unit such as a microphone, convert it into audio data, add the converted audio data to image data, output the result to other apparatuses via a network, and store the converted audio data in storage devices.

In such image processing apparatuses, audio data is used for adding information such as explanations to the image data, and it is common to digitize audio while the image data is digitized. However, if the image processing apparatus is operating at that time, operating noise and background noise are mixed into the digitized audio, degrading the clarity of the audio data.

To cope with this issue, a facsimile machine that can record and play back audio, stops mechanisms from operating during recording of the audio, and restarts those mechanisms when recording of the audio is finished has been proposed. Thus, for example, an output unit that outputs the received data, a scanner that scans documents, and a controller that controls a fan for cooling the interior of the machine are all paused during recording and restarted when recording is completed, and the stored received data is output.

In the technology described above, an operation of a driving system in the facsimile machine as the image processing apparatus is stopped, and operation is restarted after finishing recording audio. Therefore, operations of the image processing apparatus, such as image scanning and image outputting, etc., are stopped while recording audio, but at the cost of degrading utilization efficiency of the image processing apparatus.

SUMMARY

Example embodiments of the present invention provide a novel image processing apparatus that includes an audio recording unit that stores audio data based on input audio in an audio storage device, a data editing unit that adds the audio data to image data, and a controller that instructs the recording unit to record when a predetermined recording condition is satisfied.

Further example embodiments of the present invention provide an image processing method and a non-transitory recording medium storing an image processing program.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 17 is a flowchart illustrating an image processing that simultaneously controls recording and printing while noise canceling is performed as the fifth embodiment of the present invention.

DETAILED DESCRIPTION

Figure 1:
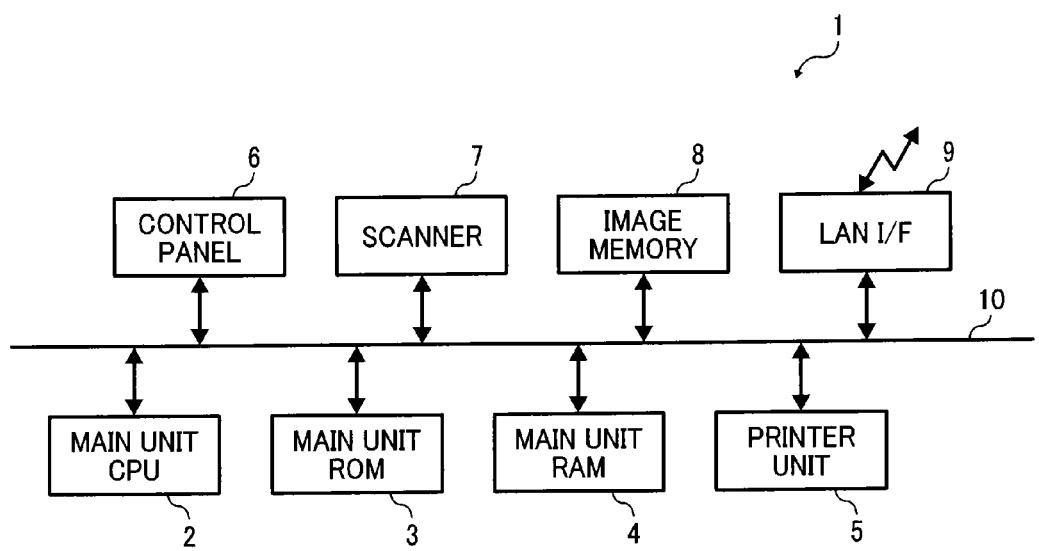
FIG. 1 is a block diagram of a multifunction peripheral as first embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In the following embodiments, an image processing apparatus that digitizes audio while maintaining audio clarity and efficient image processing is provided.

First Embodiment

A first embodiment of the present invention is described below with reference to figures from FIG. 1 to FIG. 6. FIG. 1 is a block diagram of a multifunction peripheral 1 as the first embodiment of the present invention.

As shown in FIG. 1, the multifunction peripheral 1 includes a main unit Central Processing Unit (CPU) 2, a main unit Read Only Memory (ROM) 3, a main unit Random Access Memory (RAM) 4, a printer unit 5, a control panel 6, a scanner 7, an image memory 8, and a Local Area Network (LAN) I/F 9 etc., and each unit is connected with each other via a bus 10.

The main unit ROM 3 stores an operating system for the multifunction peripheral 1, an image processing program that controls recording audio, and system data.

The main unit CPU (a data editing unit and a controlling unit) 2 performs an image processing that controls the whole part of the multifunction peripheral 1 using the main unit RAM 4 as a work memory based on the program stored in the main unit ROM 3, performs basic processes as the multifunction peripheral 1, and controls recording audio.

That is, by reading an image processing program that executes the image processing of the present invention stored in a non-transitory computer-readable recording medium such as a ROM, Electrically Erasable and Programmable Read Only Memory (EEPROM), EPROM, flash memory, flexible disk, Compact Disc Read Only Memory (CD-ROM), Compact Disc Rewritable (CD-RW), Digital Versatile Disk (DVD), Secure Digital (SD) card, and Magneto-Optical Disc (MO) etc. and reading the program and installing it in the main unit ROM 3, the multifunction peripheral 1 performs the image processing that digitizing audio ensuring audio clarity and efficiency of the image processing (described later). The image processing program is a computer-executable program written in legacy programming languages and object-oriented programming languages such as assembler, C, C++, C#, and Java etc., and it can be stored in the recording medium described above and distributed.

That is, the main CPU 2 performs a data editing process that adds audio data to image data and a controlling process executed only when a predetermined recording condition is satisfied.

Printers with various printing method can be used as the printer unit (an image recording unit) 5. For example, an electrophotographic printer that records an image on a sheet (recording medium) is used as the printer unit 5. In addition, the printer unit 5 can be a single-sided printer that forms an image on one side of the sheet only, or the printer unit 5 can be a double-sided printer that forms images on both sides of the sheet. Furthermore, the printer unit 5 can include a post-processing unit that performs post-processing on printed sheets such as punching, folding, and stapling etc. That is, the printer unit 5 performs a recording process that records an image on a sheet as a recording medium.

Image scanners, etc., that employ a Charge Couple Device (CCD) or a Complementary Metal Oxide Semiconductor (CMOS) can be used as the scanner 7, and the scanner 7 generally includes an ADF (automatic document feeder). Multiple documents are set in the ADF, and the ADF feeds the documents one by one onto a glass platen where the document is scanned in the scanner 7. After scanning the document fed from the ADF or set on the platen, the scanner 7 scans the image on the document at predetermined resolution and outputs analog image data. The scanner 7 includes an Analog/Digital (A/D) converter (not shown in figures), converts the analog image data into digital image data, and outputs it to the main unit CPU 2. The scanner 7 can be a color scanner that scans a color document. The ADF includes a document sensor (a document detector) that detects an job size set on the document tray of the ADF.

The RAM and a hard disk drive (HDD) can be used as the image memory 8, and the image memory 8 stores image data of the document scanned by the scanner 7 and image data received by the LAN I/F 9 under the control of the main unit CPU 2.

The main unit CPU 2 reads the image data stored in the image memory 8, transfers it to a terminal on a network via the LAN I/F 9, and instructs the printer unit 5 to record and output. In this case, the main unit CPU 2 converts the image data into formats such as Tag Image File Format (TIFF), Joint Photographic Experts Group (JPEG), and Portable Document Format (PDF) and stores it in the image memory 8.

The LAN I/F (data output unit) 9 is connected to a network such as Local Area Network (LAN), and the LAN I/F 9 is connected to other networks via a channel connected to the network. The LAN I/F 9 exchanges image data and e-mail with terminals (devices) on those networks such as personal computers and workstations, etc. In particular, the LAN I/F 9 sends image data to which audio data is added to those terminals (devices).

Figure 2:
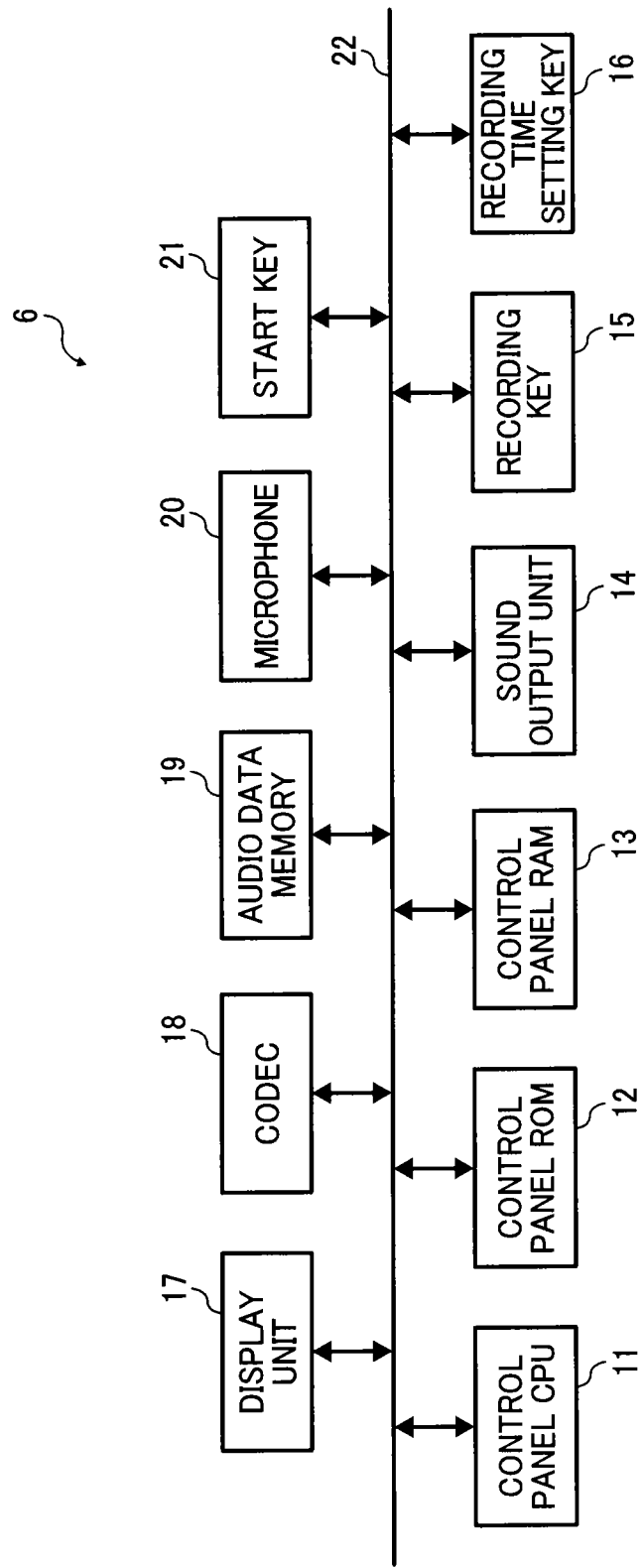
FIG. 2 is a block diagram of a control panel as the first embodiment of the present invention.

As shown in FIG. 2, the control panel 6 (a timing configuration unit, a noise level configuration unit, and a recording time configuration unit) includes a control panel CPU 11, a control panel ROM 12, a control panel RAM 13, a sound output unit 14, a recording key 15, a recording time setting key 16, a display unit 17, a COder/DECoder (CODEC) 18, an audio data memory 19, a microphone 20, and a start key 21.

The control panel ROM 12 stores a program and system data for the control panel 6.

The control panel CPU 11 controls the whole part of the control panel 6 using the control panel RAM 13 as a work memory based on the program stored in the control panel ROM 12 and performs processes as the control panel 6. In particular, the control panel CPU 11 controls recording audio using the microphone 20 under the control of the main unit CPU 2.

The sound output unit 14 consists of a speaker and a sound output circuit etc., and the sound output unit 14 amplifies and outputs the audio data as audio under the control of the control panel CPU 11.

The recording key 15 is a key to start recording sound, and the recording key 15 outputs information on operation to the control panel CPU 11.

The recording time setting key (a recording time configuration unit) 16 is used for configuring recording time, and the recording time can be configured in steps of 1 second for example. Arbitrary time can be configured as the recording time in steps of 1 second. However, the configuration is not limited to that, and it is possible to register multiple pieces of recording time in the control panel ROM 12 preliminarily and select recording time used for current recording among the multiple pieces of recording time using the recording time setting key 16.

For example, a liquid crystal display can be used for the display unit 17, and the display unit 17 displays and outputs display data under the control of the control panel CPU 11. Especially, the display unit 17 displays various information needed for an image processing along with audio recording under the control of the control panel CPU 11. The sound output unit 14 and the display unit 17 function as a report unit that reports and outputs information as a whole.

The CODEC 18 controls coding/decoding of audio data under the control of the control panel CPU 11. For example, the CODEC 18 converts the audio data into digital data such as riff WAVeform audio format (WAV) and MPeg audio layer-3 (MP3) etc.

The audio data memory (an audio storage device) 19 stores sound captured through the microphone 20 and the audio data coded/decoded by the CODEC 18.

The microphone (an audio recording unit) 20 includes an amplifier circuit etc. and captures external sound, especially audio.

The start key 21 is used for commanding to start scanning documents using the scanner 7 and start recording images on paper using the printer unit 5 by user operation.

The main unit CPU 2 converts the sound captured through the microphone 20 into appropriate audio data, adds it to the image data, and transfers it to another terminal via the LAN I/F 9. In this case, as described later, the main unit CPU 2 simultaneously controls those functions in the multifunction peripheral 1 that generate noise/conduct recording as well as digitizes the audio, thereby providing both clear audio and effective image processing.

Next, an operation in this embodiment is described below. The multifunction peripheral 1 in this embodiment digitizes audio ensuring audio clarity and effectiveness of image processing.

That is, the multifunction peripheral 1 performs an audio-added image data output process (hereinafter referred to as image processing operation) that converts audio captured through the microphone 20 into audio data, adds it to the image data, and transfers it to the other terminal, etc. The multifunction peripheral 1 performs the recording process ensuring effectiveness of the image processing operation under the condition of ensuring audio clarity.

Figure 3:
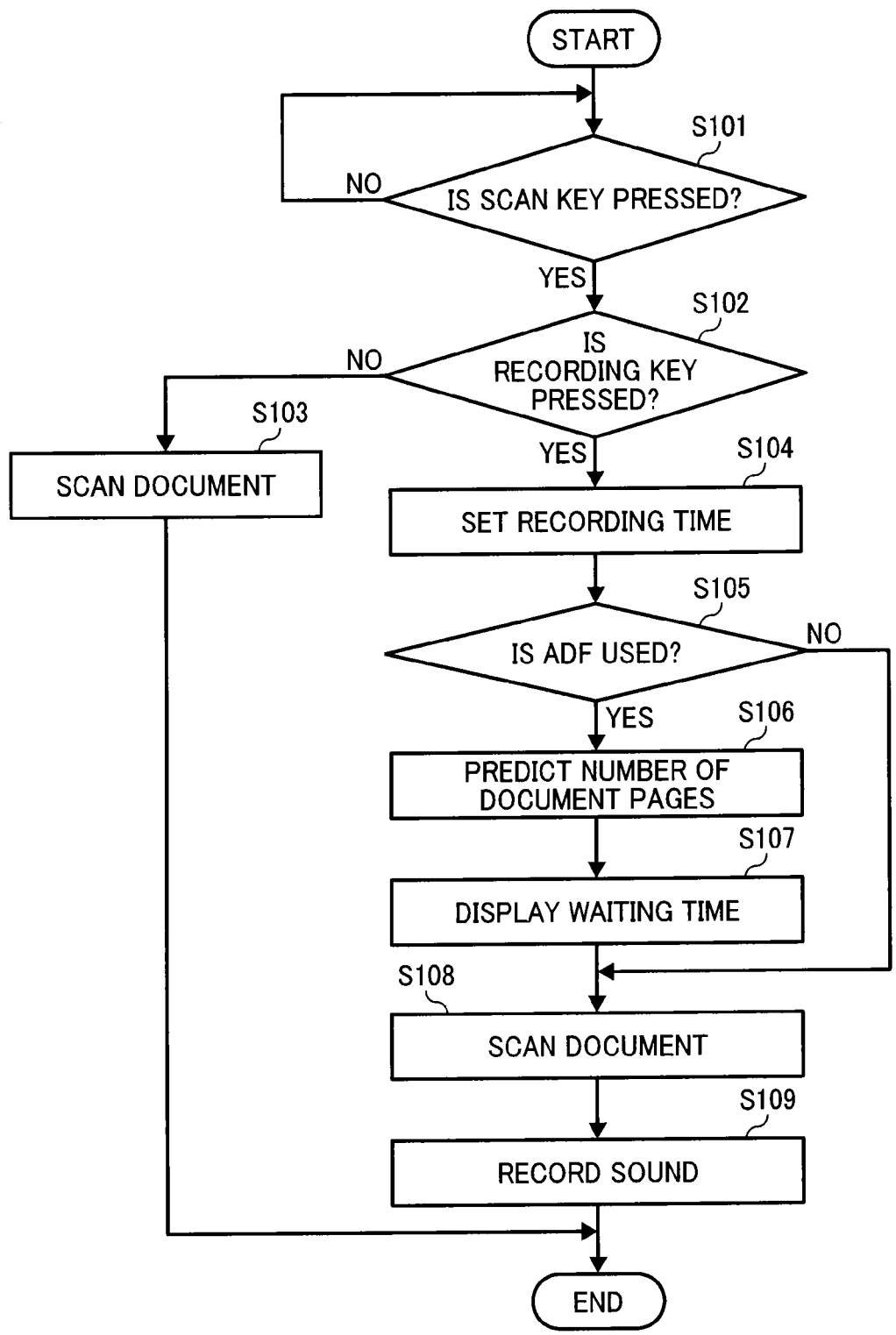
FIG. 3 is a flowchart illustrating an image processing that controls recording operation and scanning operation depending on whether or not an Auto Document Feeder (ADF) is used as the first embodiment of the present invention.

First, as shown in FIG. 3, if there are simultaneous requests to record and scan, the multifunction peripheral 1 controls the recording operation and the scanning operation under the condition of not using the ADF as a recording condition to ensure audio clarity can be ensured. That is, as shown in FIG. 3, in case of pressing the start key 21 as a scanning key in S101, the main unit CPU 2 checks if the recording key 15 is pressed, i.e., the man unit CPU 2 checks if there is a recording request in S102.

In S102, if the recording key 15 is not pressed (NO in S102), the main unit CPU 2 drives the scanner 7 and instructs the scanner 7 to scan documents. After finishing scanning all documents, the main unit CPU 2 finishes the image processing in S103.

In S102, if the recording key 15 is pressed (YES in S102), the main unit CPU 2 acquires recording time configured by the recording time setting key 16 in S104.

Next, the main unit CPU 2 checks if the scanning operation uses the ADF in S105.

In S105, if the scanning operation uses the ADF (YES in S105), the main unit CPU 2 predicts job size since the recording condition is not satisfied in S106. In predicting job size, for example, the main unit CPU 2 predicts the number of document pages based on detection result provided by a document sensor mounted on a document tray of the ADF.

Next, based on the predicted job size (the number of document pages), after calculating waiting time until finishing scanning all documents, the main unit CPU 2 displays the calculated waiting time on the display unit 17 of the control panel 6 as the waiting time until starting recording sound and/or outputs using the sound output unit 14 in S107. By displaying the waiting time on the display unit 17, etc., it is possible to know the waiting time until starting recording sound, thereby enhancing usability.

The main unit CPU 2 instructs the scanner 7 to start scanning documents in S108. After finishing scanning all documents by the scanner 7 using the ADF, the main unit CPU 2 finishes the scanning operation. Subsequently, the main unit CPU 2 starts recording operation that records audio using the microphone 20. After the recording time elapses, the main unit CPU 2 finishes the recording operation and the image processing in S109.

In S105, if the scanning operation does not use the ADF (NO in S105), the main unit CPU 2 determines that the recording condition is satisfied, instructs the scanner 7 to start scanning document in S108, and allows to start recording sound using the microphone 20 in S109. That is, the main unit CPU 2 performs the document scanning operation using the scanner 7 and the recording operation using the microphone 20 simultaneously. If each of the operations finish, the main unit CPU 2 finishes the operating process. For example, the main unit CPU 2 performs the recording operation during the recording time configured in S104. After the recording time elapses, the main unit CPU 2 finishes the recording operation.

In FIG. 3, the case that controls operation depending on whether or not it is requested to record after starting scanning operation. However, as shown in FIG. 4, first it is determined whether or not it is requested to record, it is possible to control operation after it is requested to record.

Figure 4:
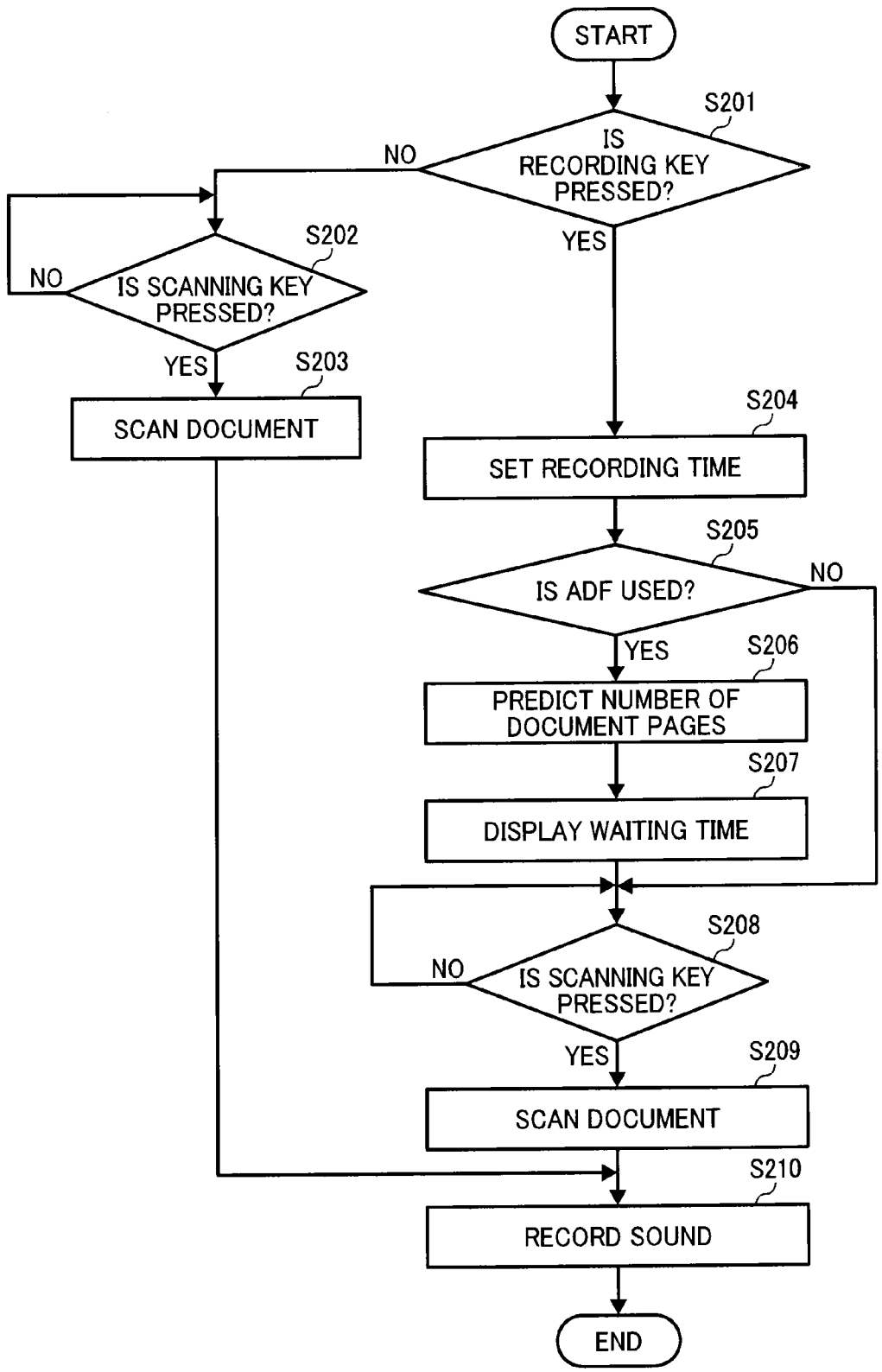
FIG. 4 is a flowchart illustrating another image processing that controls recording operation and scanning operation depending on whether or not an ADF is used as the first embodiment of the present invention.

That is, as shown in FIG. 4, the main unit CPU 2 checks whether or not the recording key 15 is pressed in S201. If the recording key 15 is not pressed (NO in S201), the main unit CPU 2 waits until the start key 21 as the scanning key is pressed in S202.

If the scanning key is pressed in S202, the main unit CPU 2 drives the scanner 7 and instructs the scanner 7 to scan documents. After finishing scanning all documents, the main unit CPU 2 finishes the image processing in S203.

If the recording key 15 is pressed (YES in S201), the main unit CPU 2 acquires the recording time configured by the recording time setting key 16 in S204.

Next, the main unit CPU 2 checks if the scanning operation uses the ADF in S205.

In S205, if the scanning operation uses the ADF (YES in S205), the main unit CPU 2 predicts job size (the number of document pages) since the recording condition is not satisfied similar to the case described above in S206.

Next, based on the predicted job size (the number of document pages), after calculating waiting time until finishing scanning all documents, the main unit CPU 2 displays the calculated waiting time on the display unit 17 of the control panel 6 as the waiting time until starting recording sound and/or outputs using the sound output unit 14 in S207.

The main unit CPU 2 waits until the scanning key (the start key 21) is pressed in S208. After the scanning key is pressed, since the ADF is used and the recording condition is not satisfied, the main unit CPU 2 instructs the scanner 7 to start scanning documents in S209. After finishing scanning all documents by the scanner 7 using the ADF, the main unit CPU 2 finishes the scanning operation. Subsequently, the main unit CPU 2 starts recording operation that records audio using the microphone 20. After the recording time elapses, the main unit CPU 2 finishes the recording operation and the image processing in S210.

In S205, if the scanning operation does not use the ADF (NO in S205), the main unit CPU 2 waits until the scanning key is pressed in S208. After the scanning key is pressed, since the recording condition is satisfied, the main unit CPU 2 instructs the scanner 7 to start scanning document in S209, and allows starting recording sound using the microphone 20 in S210. That is, the main unit CPU performs the document scanning operation using the scanner 7 and the recording operation using the microphone 20 simultaneously. If each of the operations finish, the main unit CPU 2 finishes the operating process.

As described above, the multifunction peripheral 1 in this embodiment includes the microphone 20 that stores the audio data based on the input audio in the audio data memory (an audio storage device) 19, the main unit CPU 2 (a data editing unit) that adds the audio data to image data, and the main unit CPU 2 (a controller) that performs the recording operation using the microphone 20 only if the predetermined recording condition is satisfied.

Consequently, it is possible to perform the recording operation if the recording condition that clear sound can be recorded, and it is possible to digitize audio ensuring audio clarity and effectiveness of the image processing operation.

In addition, the multifunction peripheral 1 in this embodiment performs an image processing method that includes the steps of storing the audio data based on the input audio in the audio data memory (an audio storage device) 19, adding the audio data to image data, and performing the recording operation in the storing step only if the predetermined recording condition is satisfied.

Consequently, it is possible to perform the recording operation if the recording condition that clear sound can be recorded, and it is possible to digitize audio ensuring audio clarity and effectiveness of the image processing operation.

Furthermore, the multifunction peripheral 1 in this embodiment includes a non-transitory recording medium storing a program that executes the image processing method that includes the steps of storing the audio data based on the input audio in the audio data memory (an audio storage device) 19, adding the audio data to image data, and performing the recording operation in the storing step only if the predetermined recording condition is satisfied.

Consequently, it is possible to perform the recording operation if the recording condition that clear sound can be recorded, and it is possible to digitize audio ensuring audio clarity and effectiveness of the image processing operation.

The multifunction peripheral 1 further includes the LAN I/F 9 (a data output unit) that outputs the image data in appropriate output format. The main unit CPU 2 applies the recording condition in case of recording the audio data that the main CPU 2 as the data editing unit adds to the image data output by the LAN I/F 9 using the microphone 20.

Therefore, it is possible to record audio added to the image data under the recording condition that it is possible to record clearly and to output the image data adding the clear audio.

The multifunction peripheral 1 in this embodiment further includes the scanner 7 (the scanner), and the main unit CPU 2 as the controller performs the document scanning operation using the scanner 7 and the recording operation using the microphone 20 simultaneously if the recording condition is satisfied.

Consequently, in case of satisfying the recording condition that clear sound can be recorded, it is possible to perform the recording operation and the document scanning operation simultaneously, and it is possible to digitize audio ensuring audio clarity and effectiveness of the image processing operation.

In the multifunction peripheral 1 in this embodiment, the main CPU 2 considers the condition that the scanner 7 scans a document set on the platen as the recording condition described above.

Consequently, it is possible to perform the recording operation in the document scanning operation whose operational noise is relatively low, and it is possible to digitize audio ensuring audio clarity and effectiveness of the image processing operation.

Furthermore, the multifunction peripheral 1 in this embodiment includes an ADF (an auto document transferring unit) that transfers a document set on a document tray that can accommodate multiple pages of document to the scanner 7 one by one, a document sensor (a document detector) that detects the number of document pages se on the document tray, the sound output unit 14 as a report unit that reports information, and the display unit 17. In the multifunction peripheral 1 in this embodiment, after setting the document on the document tray, It is possible to record audio using the microphone 20 based on the number of document pages detected by the document sensor after the scanner 7 scans the document on the document tray, and the CPU 2 instructs the report unit to output the waiting time.

Consequently, it is possible to know the waiting time until it is possible to start recording, improving usability.

Figure 5:
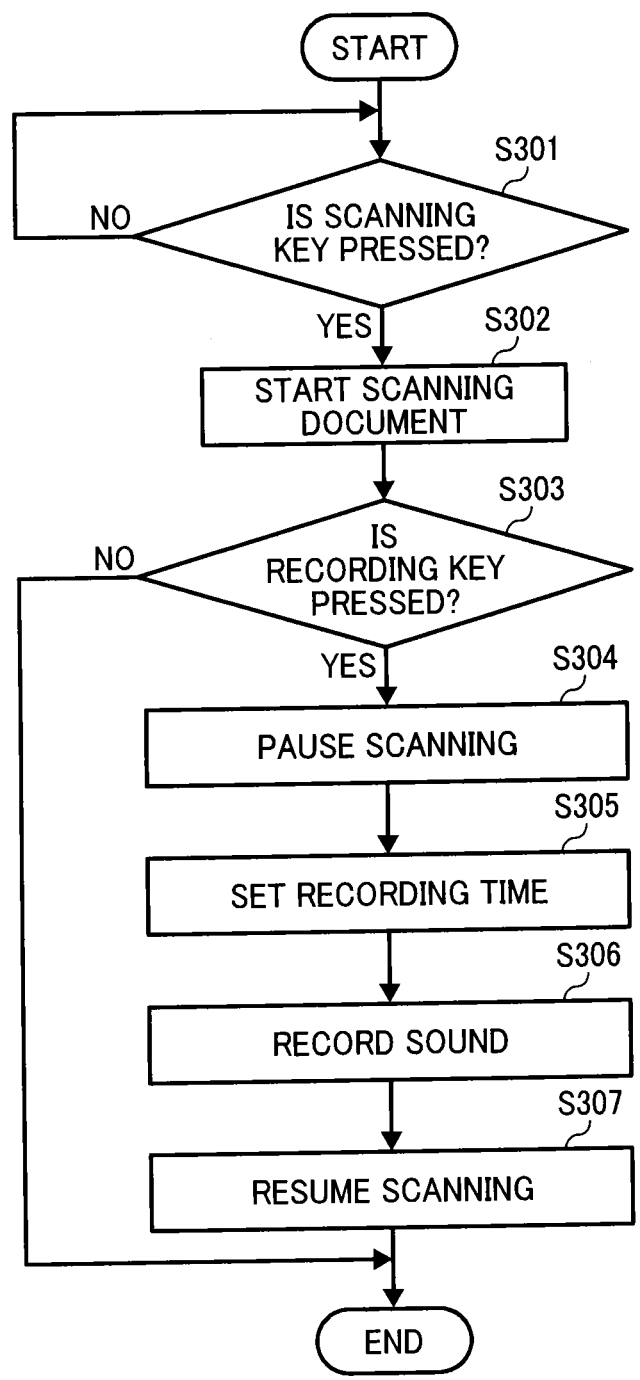
FIG. 5 is a flowchart illustrating an image processing that controls operation depending on whether or not it is requested to record after starting scanning operation as the first embodiment of the present invention.

In the above description, the requested operation is started after checking whether or not the scanning operation or the audio recording operation is requested. However, as shown in FIG. 5, if the scanning operation is requested, it is possible to start performing the scanning operation, and subsequently it is possible to control the operation depending on whether or not the recording key 15 is pressed.

That is, after setting the document on the ADF, if the main unit CPU 2 detects that the scanning key is pressed in S301, the main unit CPU 2 instructs the scanner 7 to start scanning the document in S302.

After starting scanning the document, the main unit CPU 2 checks whether or not the recording key 15 is pressed in S303.

If the recording key 15 is not pressed (NO in S303), the main unit CPU 2 scans all of the documents. After finishing scanning all of the documents, the main unit CPU 2 finishes the image processing.

If the recording key 15 is pressed (YES in S303), the main unit CPU 2 interrupts the scanning operation in S304, and the main unit CPU 2 acquires the recording time configured by the recording time setting key 16 in S305.

Next, the main unit CPU 2 starts the recording operation that records the audio using the microphone 20. After the recording time elapses, the main unit CPU 2 finishes the recording operation in S306 and resumes the document scanning operation using the scanner 7. After finishing scanning all of the documents, the main unit CPU 2 finishes the image processing and adds the recorded audio data to the scanned image data in S307.

As described above, in the multifunction peripheral 1 in this embodiment, if the recording operation using the microphone 20 during the scanning operation of the document by the scanner 7 is requested or the document scanning operation using the scanner 7 during the recording operation using the microphone 20 is requested, the main unit CPU 2 performs the recording operation and the scanning operation sequentially if the recording condition is not satisfied.

Therefore, it is possible to control the scanning operation during the recording operation or the recording operation during the scanning operation based on the recording condition appropriately, and it is possible to digitize audio ensuring audio clarity and effectiveness of the image processing operation.

Figure 6:
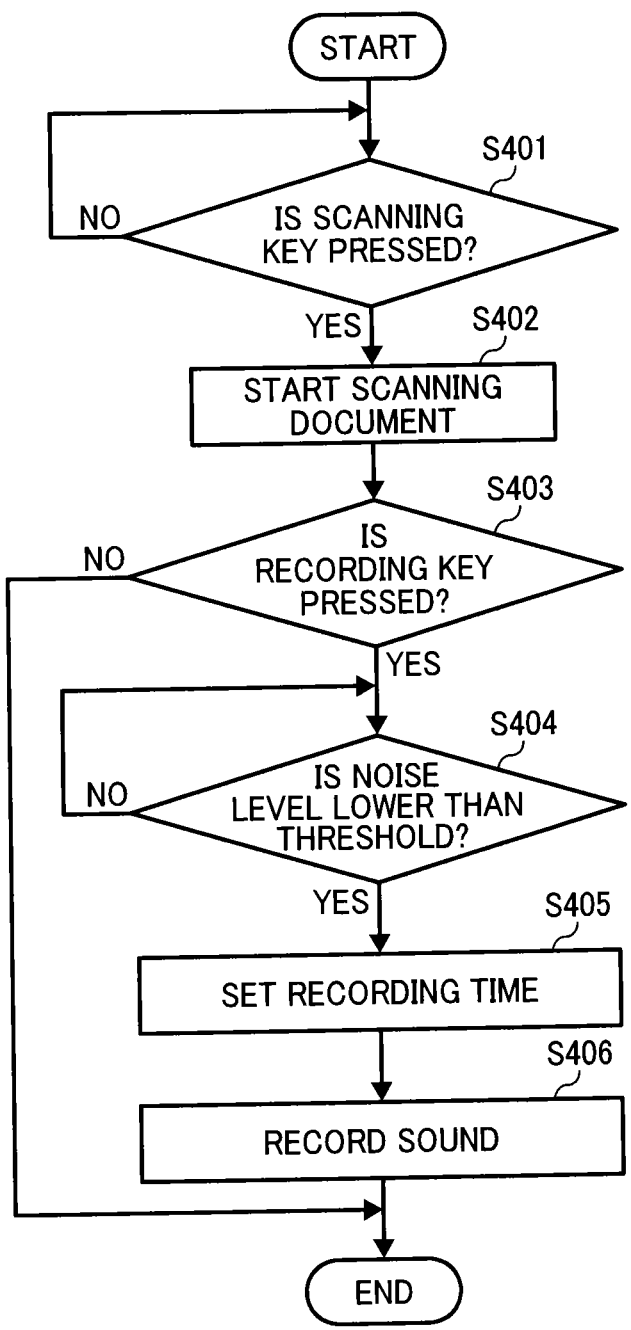
FIG. 6 is a flowchart illustrating an image processing whose recording condition is environmental noise as the first embodiment of the present invention.

Furthermore, in the above description, whether or not the scanning operation uses the ADF is used for the recording condition that the recording operation and the scanning operation is performed simultaneously. However, the recording condition is not limited to whether or not the ADF is used. For example, as shown in FIG. 6, a condition that environmental noise is smaller than predetermined threshold volume can be used as the recording condition. The case shown in FIG. 6 is applied to the case that the image processing is controlled depending on whether or not the recording operation is requested after starting the scanning operation similar to the case shown in FIG. 5. However, the case shown in FIG. 6 can be applied to the cases shown in FIGS. 3 and 4 similarly.

That is, in this case, the multifunction peripheral 1 uses the microphone as a noise acquisition unit that acquires environmental noise, and threshold noise level is stored in the main unit ROM 3 preliminarily as the recording condition on whether or not the recording operation is allowed.

In FIG. 6, after detecting that the scanning key is pressed in S401, the main unit CPU 2 instructs the scanner 7 to start scanning the document in S402.

After starting scanning, the main unit CPU 2 checks whether or not the recording key 15 is pressed in S403.

If the recording key 15 is not pressed (NO in S403), the main unit CPU 2 scans all of the documents. After finishing scanning all of the documents, the main unit CPU 2 finishes the image processing.

If the recording key 15 is pressed (YES in S403), the main unit CPU 2 acquires the environmental noise using the microphone 20 and calculates its environmental noise level. The main unit CPU 2 checks whether or not the calculated environmental noise level is below the threshold noise level in S404.

If the environmental noise level is higher than the threshold noise level in S404, the main CPU 2 determines that audio clarity deteriorates if the recording operation is performed, and continues the scanning operation if the scanning operation is not finished yet without starting the recording operation.

If the environmental noise level is below the threshold noise level in S404, the main CPU 2 acquires the recording time configured by the recording time setting key 16 in S405. Subsequently, the main unit CPU 2 starts the recording operation that records the user's audio using the microphone 20. After the recording time elapses, the main unit CPU 2 finishes the recording operation in S406.

The multifunction peripheral 1 in this embodiment further includes the microphone 20 (a noise level meter) that measures ambient noise level, and the main unit CPU 2 regards the condition that the noise level measured by the microphone 20 is below the predetermined threshold level as the recording condition.

Consequently, it is possible to perform the recording operation considering not only the operational noise of the multifunction peripheral 1 but also the surrounding environmental noise, it is possible to digitize audio ensuring audio clarity furthermore.

Second Embodiment

Figure 7:
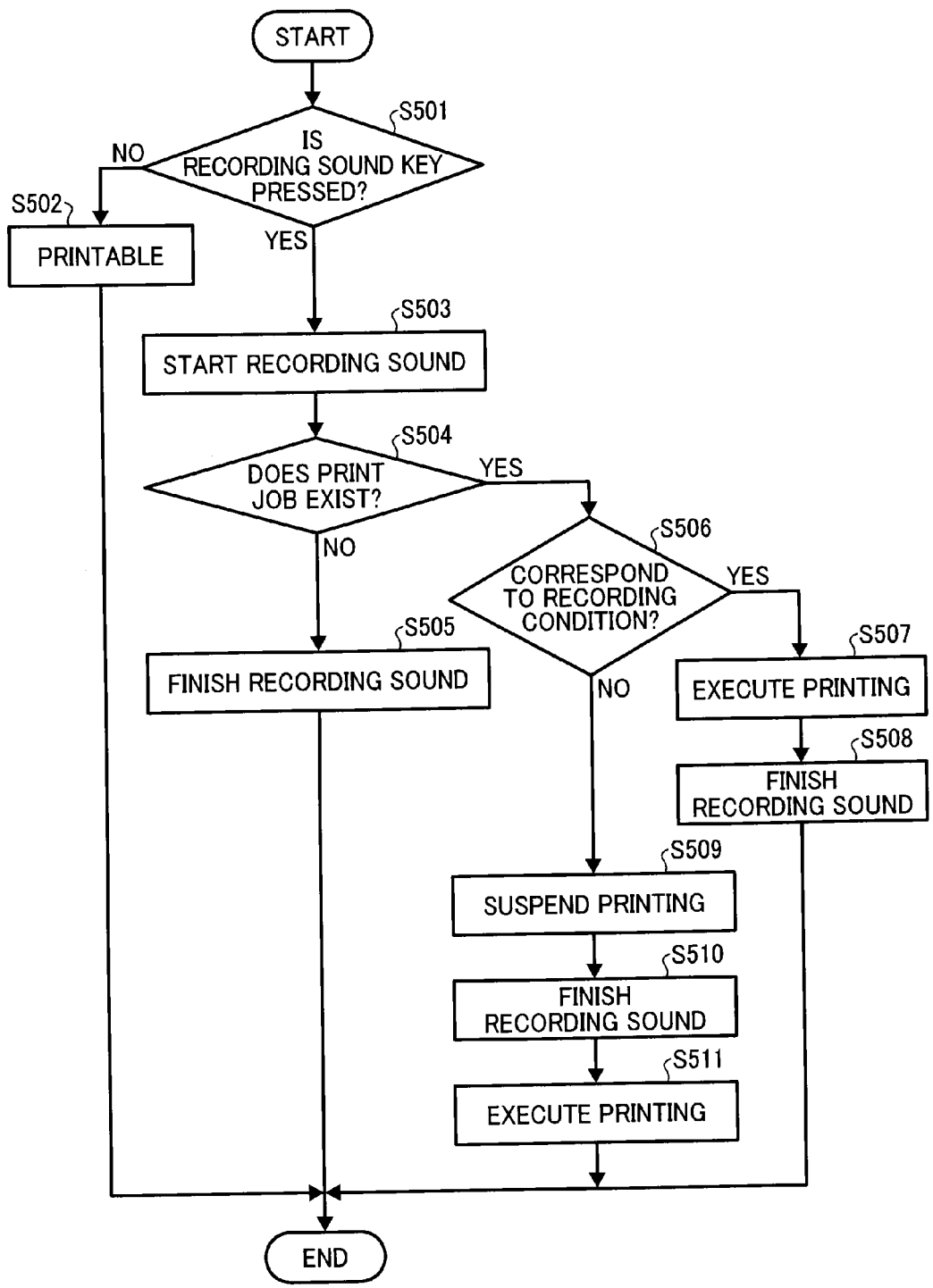
FIG. 7 is a flowchart illustrating an image processing that simultaneously controls recording and printing as a second embodiment of the present invention.

FIG. 7 is a flowchart illustrating an image processing that controls the recording and printing based on the recording condition as a second embodiment.

The second embodiment is applied to a multifunction peripheral similar to the multifunction peripheral 1 in the first embodiment described above, and the same reference symbols as in the first embodiment is used in the description below.

In this embodiment, if a print job is issued, it is controlled to perform the recording and printing simultaneously depending on whether or not the print job satisfies the recording condition.

That is, as shown in FIG. 7, the main unit CPU 2 checks whether or not the recording key 15 is pressed in order to record audio attached to image data of a document scanned by the scanner 7 in S501.

If the recording key 15 is not pressed (NO in S501), the main unit CPU 2 determines that the printing operation (recording operation) can be performed using the printer unit 5 and finishes the image processing in S502.

In S501, if the recording key 15 is pressed (YES in S501), the main unit CPU 2 starts the recording operation that records audio using the microphone 20 in S503.

After starting the recording operation, the main unit CPU 2 checks whether or not a print job is issued in S504.

If there is no print job in S504, the main unit CPU 2 continues the recording operation as is. After the recording time elapses, the main unit CPU 2 finishes the recording operation and the image processing in S505.

If there is a print job in S504, the main unit CPU 2 determines whether or not the recording condition is satisfied in S506. The recording condition is the condition that it is possible to record clearly even if the recording and printing are performed simultaneously. Examples of the recording operation are whether or not duplex printing is performed and whether or not post-processing after printing (e.g., stapling and punching) is performed. That is, in duplex printing, the operational noise of the paper reversal mechanism is large and it is possible that the noise is get mixed in the recording audio data. In this case, the recording condition is that duplex printing is not performed. In addition, in case of performing post-processing such as stapling and punching, post-processing noise can affect the recorded data. Therefore, the recording condition is that post-processing is not performed in the printing operation in that case.

If the recording condition is satisfied in S506, the main unit CPU 2 continues the recording operation and performs the printing operation in S507. After the recording time elapses, the main unit CPU 2 finishes the recording operation in S508. After finishing the printing operation, the main unit CPU 2 finishes the image processing operation.

If the recording condition is not satisfied in S506, the main unit CPU 2 pauses the printing operation (the outputting operation) in S509 and continues the recording operation. After the recording time elapses, the main unit CPU 2 finishes the recording operation in S510. After finishing the recording operation, the main unit CPU 2 starts the printing operation. After finishing printing, the main unit CPU 2 finishes the printing operation and the image processing operation in S511.

Figure 8:
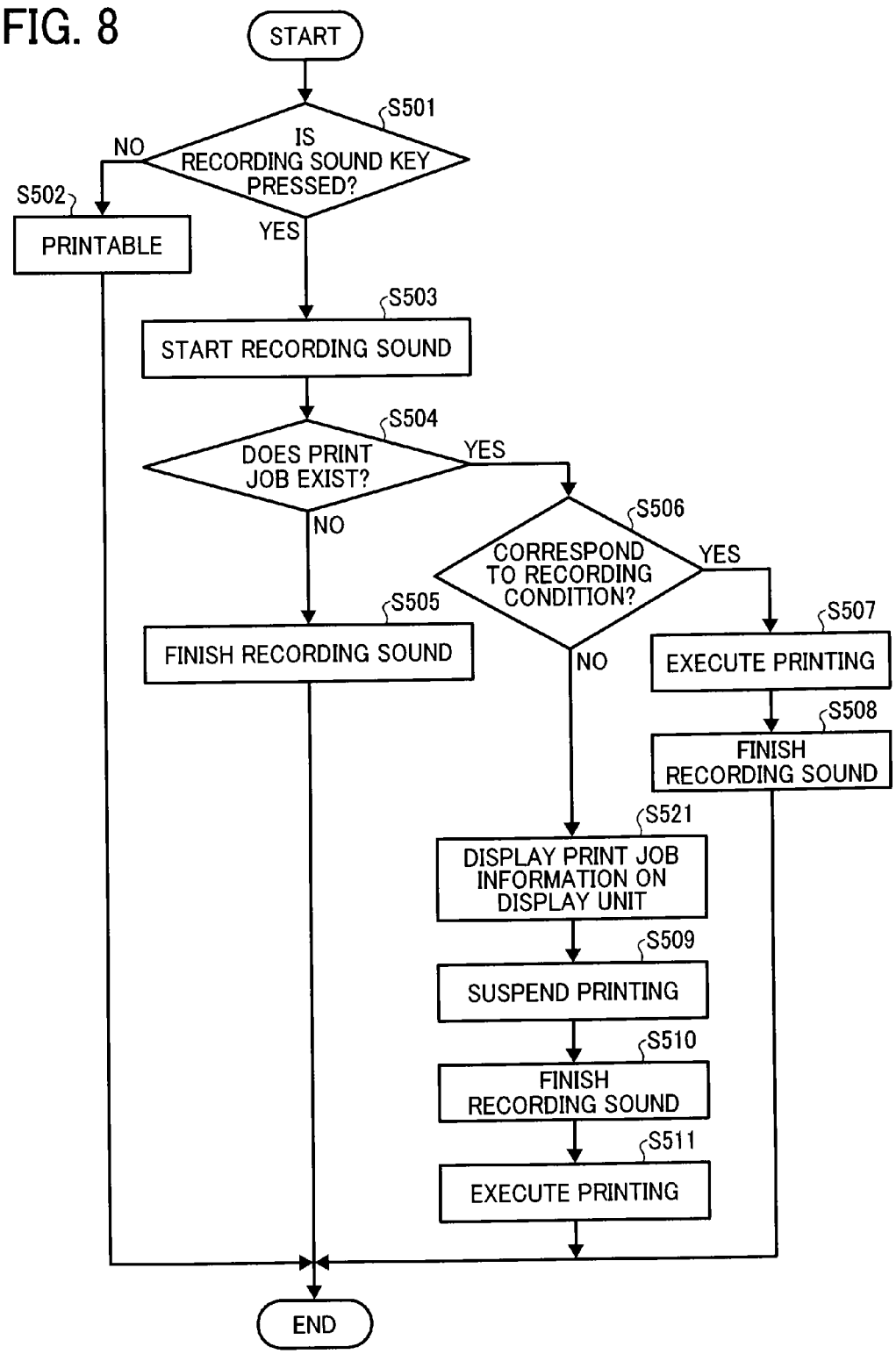
FIG. 8 is a flowchart illustrating an image processing that reports print job information if the recording and printing cannot be performed simultaneously as the second embodiment of the present invention.

If the recording condition is not satisfied in S506 in FIG. 7, as shown in FIG. 8, it is possible to display job information on the print job on the display unit 17. In FIG. 8, the same step number is assigned to the same processing step shown in FIG. 7, and descriptions of those steps are omitted or simplified.

In S501, if the recording key 15 is pressed (YES in S501), the main unit CPU 2 starts the recording operation that records audio using the microphone 20 in S503, and checks whether or not a print job is issued in S504. If there is no print job in S504, the main unit CPU 2 continues the recording operation as is. After the recording time elapses, the main unit CPU 2 finishes the recording operation and the image processing in S505.

If there is a print job in S504, the main unit CPU 2 determines whether or not the recording condition is satisfied in S506.

If the recording condition is satisfied in S506, the main unit CPU 2 continues the recording operation and performs the printing operation in S507. After the recording time elapses, the main unit CPU 2 finishes the recording operation in S508. After finishing the printing operation, the main unit CPU 2 finishes the image processing operation.

If the recording condition is not satisfied in S506, the main unit CPU 2 displays the print job information on the display unit 17 of the control panel 6 in S521 and pauses the printing operation in S509. Subsequently, after continuing the recording operation and the recording time elapses, the main unit CPU 2 finishes the recording operation in S510. After finishing the recording operation, the main unit CPU 2 starts the printing operation. After finishing printing, the main unit CPU 2 finishes the printing operation and the image processing operation in S511.

Figure 9A:
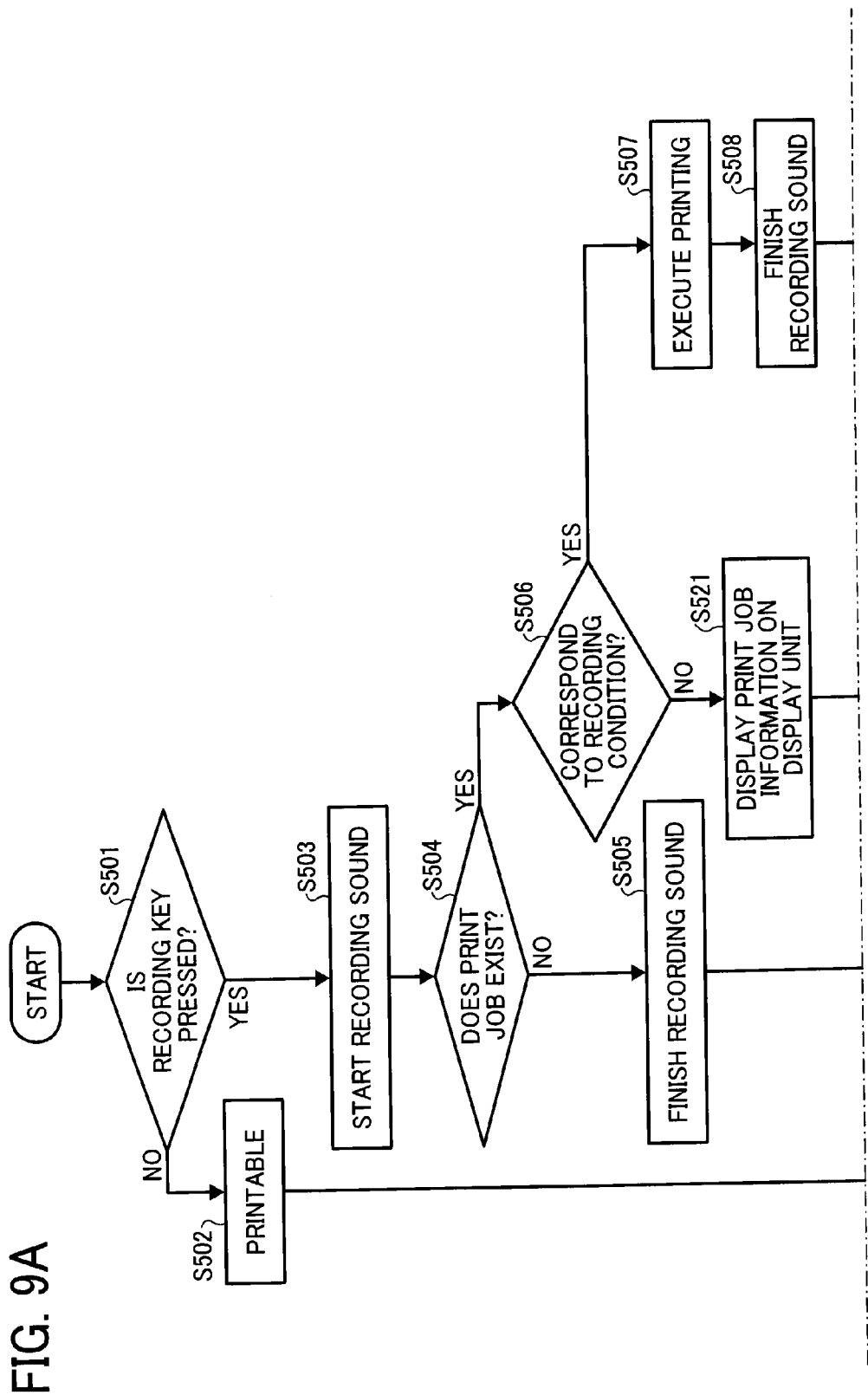
FIGS. 9A and 9B are flowcharts illustrating an image processing depending on user selection if the recording and printing cannot be performed simultaneously as the second embodiment of the present invention.
Figure 9B:
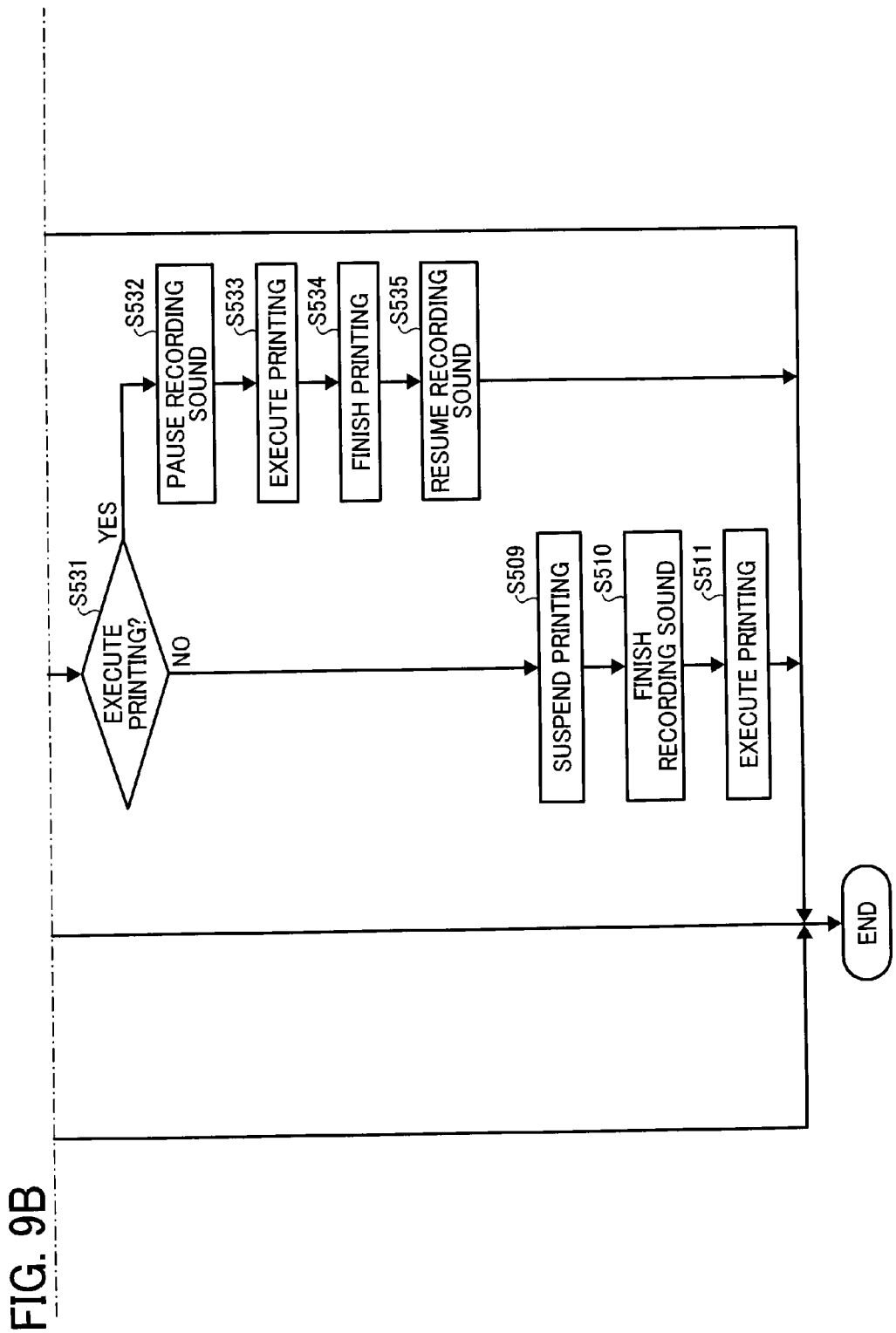

If the recording condition is not satisfied in S506 in FIG. 7, as shown in FIG. 9, it is possible to display job information on the print job on the display unit 17. In FIG. 9, the same step number is assigned to the same processing step shown in FIGS. 7 and 8, and descriptions of those steps are omitted or simplified.

In FIG. 9, if the recording key 15 is pressed in S501, the main unit CPU 2 starts the recording operation that records audio using the microphone 20 in S503, and checks whether or not a print job is issued in S504. If there is no print job in S504, the main unit CPU 2 continues the recording operation as is. After the recording time elapses, the main unit CPU 2 finishes the recording operation and the image processing in S505.

If there is a print job in S504, the main unit CPU 2 determines whether or not the recording condition is satisfied in S506.

If the recording condition is satisfied in S506, the main unit CPU 2 continues the recording operation and performs the printing operation in S507. After the recording time elapses, the main unit CPU 2 finishes the recording operation in S508. After finishing the printing operation, the main unit CPU 2 finishes the image processing operation.

If the recording condition is not satisfied in S506, the main unit CPU 2 displays the print job information on the display unit 17 of the control panel 6 in S521, and the main unit CPU 2 displays an inquiry asking whether or not the printing operation is performed on the display unit 17 in S531.

If it is selected not to perform the printing operation (NO in S531), the main unit CPU 2 pauses the printing operation in S509. Subsequently, after continuing the recording operation and the recording time elapses, the main unit CPU 2 finishes the recording operation in S510. After finishing the recording operation, the main unit CPU 2 starts the printing operation. After finishing printing, the main unit CPU 2 finishes the printing operation and the image processing operation in S511.

If it is selected to perform the printing operation (YES in S531), the main unit CPU 2 interrupts the recording operation in S532 and performs the printing operation in S533. After finishing printing, the main unit CPU 2 finishes all printing operations in S534 and resumes the recording operation. After the recording time elapses, the main unit CPU 2 finishes the recording operation in S306 and finishes the image processing operation in S535.

As described above, the multifunction peripheral in this embodiment further includes the printer unit 5 (an image recording unit). If the recording condition is satisfied, the main unit CPU 2 performs the image recording operation using the printer unit 5 and the recording operation using the microphone 20 simultaneously. If the recording condition is not satisfied, the main unit CPU 2 performs the image recording operation using the printer unit 5 and the recording operation using the microphone 2 sequentially.

Consequently, even if the recording operation and the image recording operation are requested simultaneously, it is possible to control the operations appropriately based on the recording condition. As a result, it is possible to control the request for recording images during the recording operation and the request for recording sound during the image recording operation appropriately based on the recording condition, and it is possible to digitize audio ensuring audio clarity and effectiveness of the image processing operation.

As described above, in the multifunction peripheral 1 in this embodiment, if the recording operation using the microphone 20 during the image recording operation using the printer unit 5 is requested or the image recording operation using the printer unit 5 during the recording operation using the microphone 20 is requested, the main unit CPU 2 performs the image recording operation and the recording operation sequentially if the recording condition is not satisfied.

Consequently, even if the recording operation and the image recording operation are requested simultaneously, it is possible to perform those operations sequentially if the recording condition is not satisfied. As a result, it is possible to control process the request for the image recording operation during the recording operation and the request for the recording operation during the image recording operation sequentially and appropriately, and it is possible to digitize audio ensuring audio clarity and effectiveness of the image processing operation.

Third Embodiment

Figure 10:
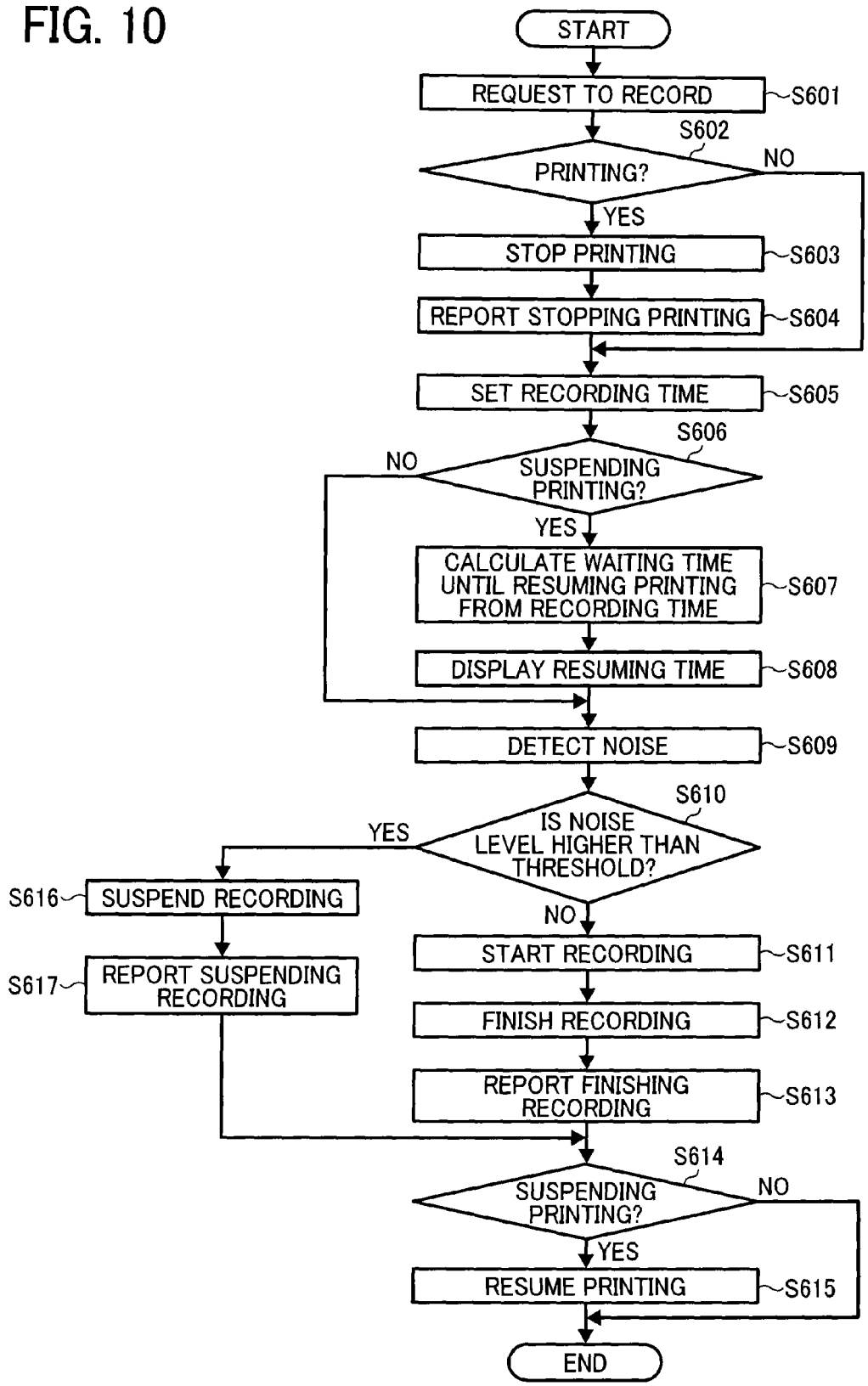
FIG. 10 is a flowchart illustrating an image processing as a third embodiment of the present invention.
Figure 11:
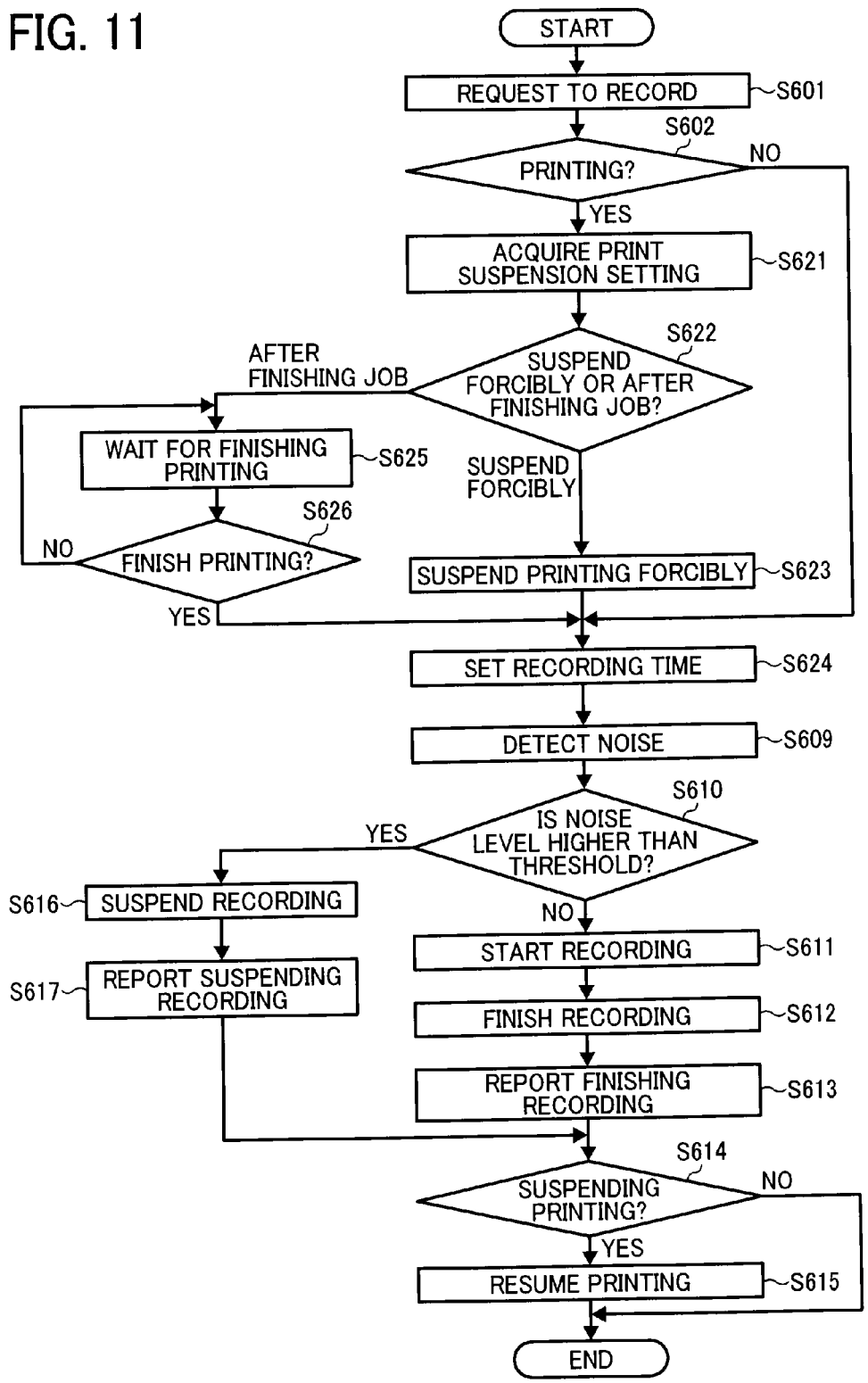
FIG. 11 is a flowchart illustrating an image processing that controls printing operation depending on settings in case of requesting to record as the third embodiment of the present invention.
Figure 12:
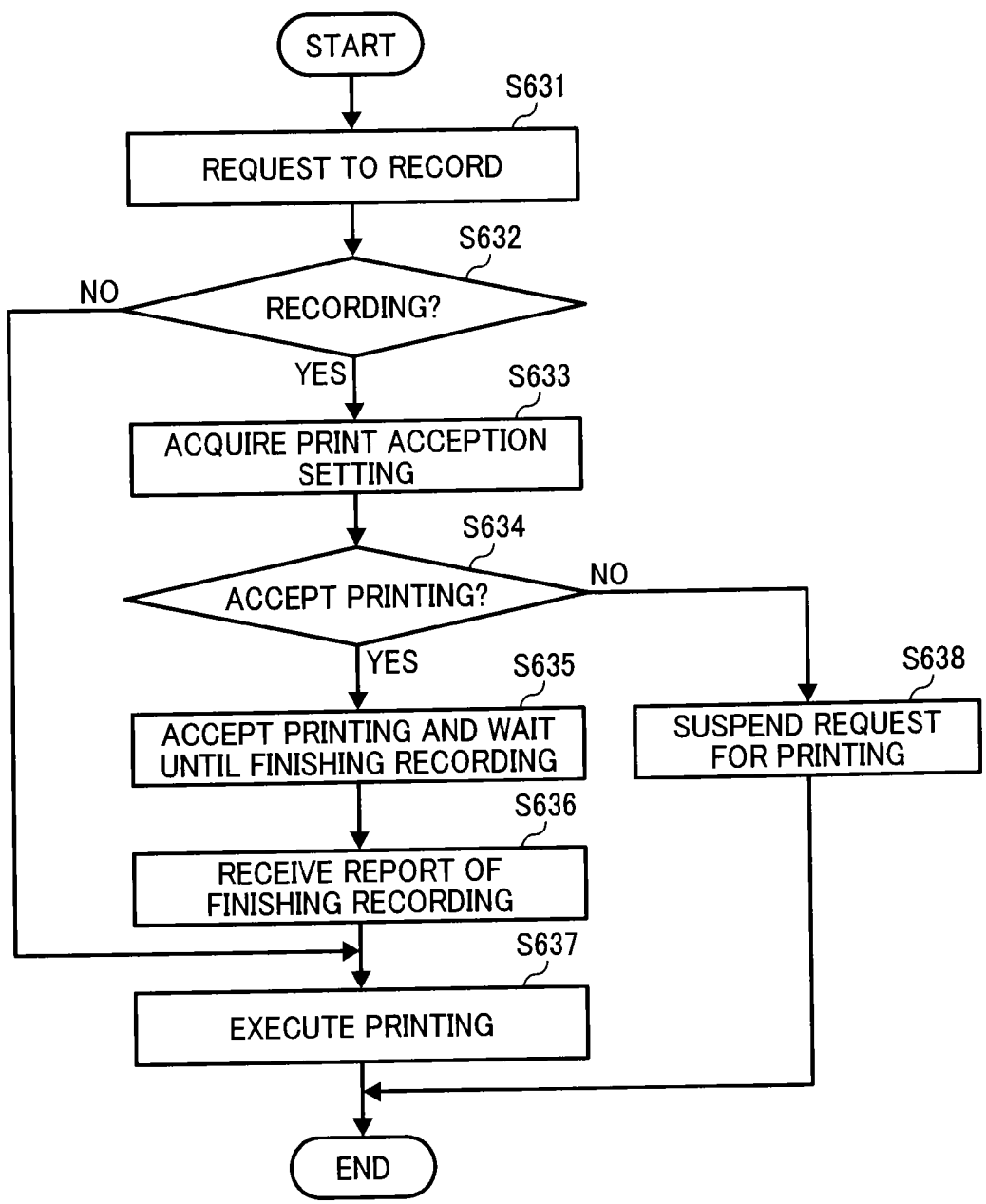
FIG. 12 is a flowchart illustrating an image processing that controls request for printing depending on whether or not recording is performed in case of requesting to print as the third embodiment of the present invention.
Figure 13:
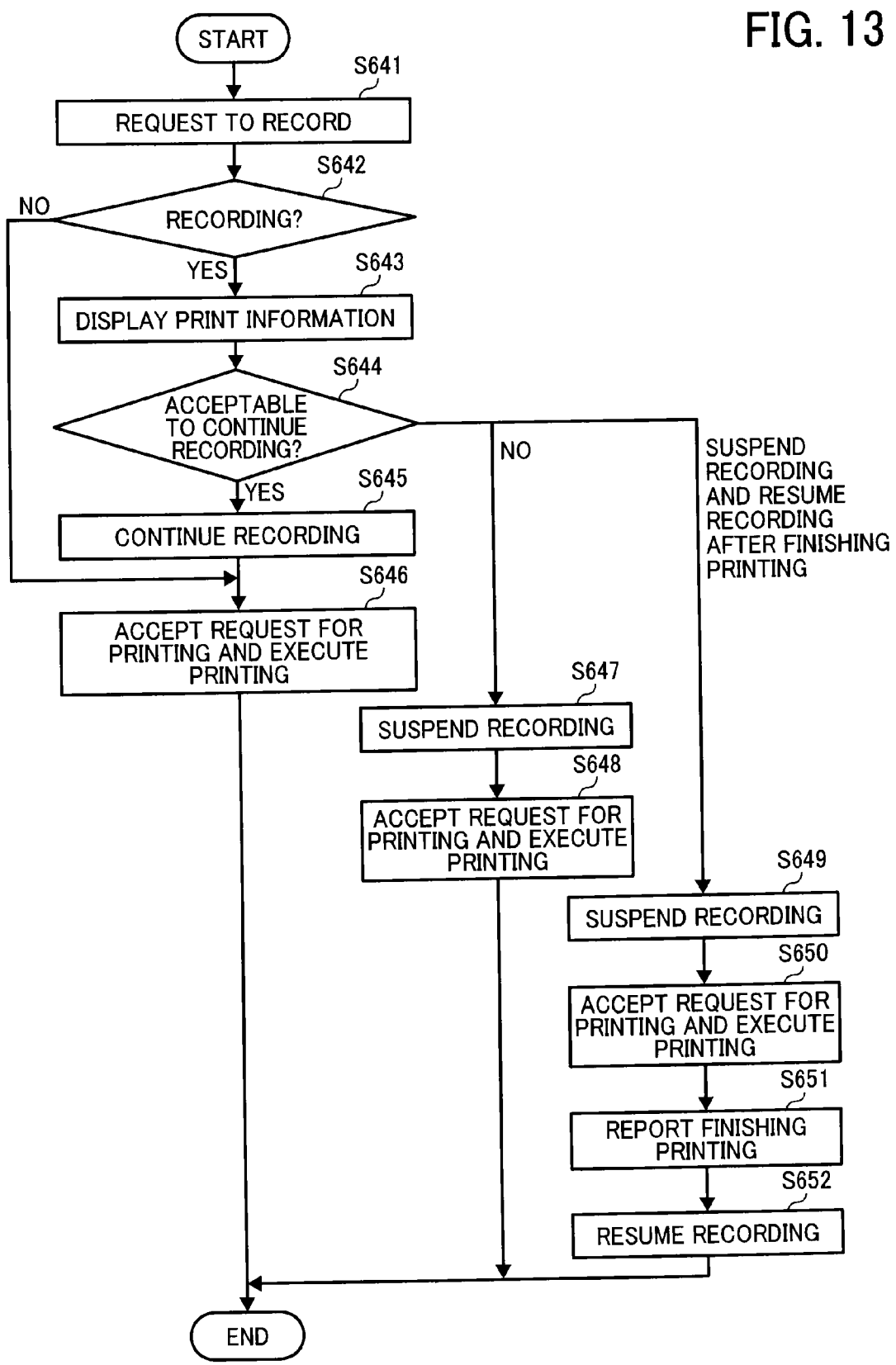
FIG. 13 is a flowchart illustrating that controls printing depending on whether or not it is possible to record in case of recording when it is requested to print as the third embodiment of the present invention.

A third embodiment of the present invention is described below with reference to figures from FIG. 10 to FIG. 13. FIG. 10 is a flowchart illustrating an image processing that performs the recording operation that prioritizes clarity in this embodiment. FIG. 11 is a flowchart illustrating an image processing that controls printing operation depending on settings in case of requesting to record. FIG. 12 is a flowchart illustrating an image processing that controls printing request for printing depending on whether or not recording is performed in case of requesting to print. FIG. 13 is a flowchart illustrating that controls printing depending on whether or not it is possible to record in case of recording when it is requested to print as the third embodiment of the present invention.

The third embodiment is applied to a multifunction peripheral similar to the multifunction peripheral 1 in the first embodiment described above, and the same reference symbols as in the first embodiment are used in the description below.

In this embodiment, if the recording operation is requested, the recording operation that prioritizes clarity of recording is performed.

That is, in FIG. 10, if the recording operation is requested in S601, the main unit CPU 2 checks whether or not the printing process is performed currently in S602.

If the printing process is performed currently (YES in S602), first, the main unit CPU 2 stops printing in S603 and reports that the printing process has been stopped in S604. For example, the main unit CPU 2 reports that the printing process has been stopped by displaying that message on the display unit 17 of the control panel 6.

Next, after configuring the recording time using the recording time setting key 16 in S605, the main unit CPU 2 checks whether or not the printing process has been stopped in S606. If the printing process has been stopped (YES in S606), the CPU 2 calculates the waiting time until the printing process is restarted from the recording time in S607, and the CPU 2 displays the waiting time until the printing process is restarted on the display unit in S608. The main unit CPU 2 detects noise using the microphone 20 in S609 and checks whether or not the noise is larger than preset threshold level in S610. The threshold level indicates threshold of whether or not audio clarity can be assured in recording audio.

If the printing process has not been stopped (NO in S606), the process proceeds to S609, and the main unit CPU 2 detects noise in S609. The main unit CPU 2 checks whether or not the noise level is higher than preset threshold level in S610.

If the noise level is below the threshold level (NO in S610), the main unit CPU 2 determines that it is possible to record clearly and starts recording audio using the microphone 20 in S611. After the configured recording time elapses, the main unit CPU 2 finishes recording audio in S612 and reports that the recording process is finished by displaying a message that the recording process is finished on the display unit 17 etc. in S613

Next, the main unit CPU 2 checks whether or not the printing process has been stopped in S614. If the printing process has been stopped (YES in S614), the main unit CPU 2 resumes the stopped printing process and finishes the image processing operation after finishing printing S615.

If the printing process has not been stopped (NO in S614), the main unit CPU 2 finishes the image processing operation as is.

If the noise level is higher than the threshold level (YES in S610), the main unit CPU determines that it is not possible to ensure audio clarity in recording audio and stops the request for recording sound in S616.

Next, the main unit CPU 2 reports that the recording operation has been stopped by displaying a message that the recording operation has been stopped on the display unit 17 etc. in S617, and the main unit CPU 2 checks whether or not the printing process has been stopped in S614.

If the printing process has been stopped in S614, the main unit CPU 2 resumes the stopped printing process. After finishing printing, the main unit CPU 2 finishes the image processing operation in S615.

If the printing process has not been stopped in S614, the main unit CPU 2 finishes the image processing operation as is.

If the printing process is not performed currently (NO in S602), the process proceeds to S605, and the main unit CPU 2 performs processing as described above from configuring the recording time (the steps from S605 to S617).

In the case shown in FIG. 10, it is possible to control either performing the recording operation after stopping the printing process forcibly or performing the recording operation after finishing the printing process depending on user configuration when the recording operation is requested as shown in FIG. 11. In FIG. 11, the same step number is assigned to the same processing step shown in FIG. 10, and descriptions of those steps are omitted or simplified.

That is, in FIG. 11, if the recording operation is requested in S601, the main unit CPU 2 checks whether or not the printing process is performed currently in S602.

If the printing process is performed currently in S602, the main unit CPU 2 acquires a configuration on stopping the printing process forcibly in S621, and the main unit CPU 2 checks whether the printing process is to be stopped forcibly or the recording operation is to be performed after finishing the print job in S622.

If the configuration is that the print process is to be stopped forcibly in S622, the main unit CPU 2 stops printing forcibly in S623. After configuring the recording time using the recording time setting key 16, the main unit CPU 2 acquires the recording time in S624.

If the configuration is that the recording process is to be performed after finishing the print job in S622, the main unit CPU 2 waits for finishing printing in S625 and checks whether or not the printing process has been finished in S626. If the printing process has not been finished (NO in S626), the process returns to S615, and the main unit CPU 2 waits for finishing printing in S625 and S626.

If the printing process is finished (YES in S626), after configuring the recording time using the recording time setting key 16, the main unit CPU 2 acquires the recording time in S624.

Next, the process is the same as the steps after S609 in FIG. 10. That is, the main unit CPU 2 detects noise using the microphone 20 in S609 and checks whether or not the noise is higher than preset threshold level in S610.

If the noise level is below the threshold level in S610, the main unit CPU 2 determines that it is possible to record clearly and starts recording audio using the microphone 20 in S611. After the configured recording time elapses, the main unit CPU 2 finishes recording audio in S612 and reports that the recording process is finished by displaying a message that the recording process is finished on the display unit 17 etc. in S613

Next, the main unit CPU 2 checks whether or not the printing process has been stopped in S614. If the printing process has been stopped, the main unit CPU 2 resumes the stopped printing process and finishes the image processing operation after finishing printing S615.

If the printing process has not been stopped in S614, the main unit CPU 2 finishes the image processing operation as is.

If the noise level is higher than the threshold level (YES in S610), the main unit CPU determines that it is not possible to ensure audio clarity in recording audio and stops the request for recording sound in S616.

Next, the main unit CPU 2 reports that the recording operation has been stopped by displaying a message that the recording operation has been stopped on the display unit 17 etc. in S617, and the main unit CPU 2 checks whether or not the printing process has been stopped in S614.

If the printing process has been stopped in S614, the main unit CPU 2 resumes the stopped printing process. After finishing printing, the main unit CPU 2 finishes the image processing operation in S615.

If the printing process has not been stopped in S614, the main unit CPU 2 finishes the image processing operation as is.

If the printing process is not performed currently in S602, the process proceeds to S624, and the main unit CPU 2 performs processing as described above from configuring the recording time (S624 and the steps from S609 to S617).

In FIG. 10 and FIG. 11, the multifunction peripheral 1 controls processing depending on whether or not the printing process is currently performed in case of requesting the recording operation. By contrast, the multifunction peripheral 1 can control processing depending on whether or not the recording operation is currently performed in case of requesting the printing operation as shown in FIG. 12 and FIG. 13.

That is, as shown in FIG. 12, in case of requesting printing in S631, the main unit CPU 2 checks whether or not the recording operation is currently performed in S632.

If the recording operation is currently performed (YES in S632), the main unit CPU 2 acquires a configuration on accepting printing configured using the control panel 6 by user operation preliminarily in S633. That is, the main unit CPU 2 acquires information on whether or not it is configured to accept the request for printing by user operation during the recording operation.

Next, the main unit CPU 2 checks whether or not the configuration is set to accept the request for printing in S634.

If it is configured to accept printing (YES in S634), the main unit CPU 2 accepts the request for printing and pauses the printing operation until the end of recording in S635.

After the recording time elapses and it is finished recording in S636, the main unit CPU 2 performs the standby printing operation. After finishing printing, the main unit CPU 2 finishes the image processing in S637.

If it is not configured to accept printing (NO in S634), the main unit CPU 2 rejects the request for printing, performs the recording operation for the recording time, and finishes the image processing in S638.

If the recording operation is not performed currently (NO in S632), the main unit CPU 2 performs the requested printing. After finishing printing, the main unit CPU 2 finishes the image processing in S637.

As shown in FIG. 13, it is possible to control printing depending on a configuration on whether or not the recording operation can be continued in case of requesting printing during the recording operation.

That is, as shown in FIG. 13, in case of requesting printing in S641, the main unit CPU 2 checks whether or not the recording operation is currently performed in S642.

If the recording operation is currently performed (YES in S632), the main unit CPU 2 acquires print information on the request for printing (e.g., the number of pages and priority etc.) and displays the print information on the display unit 17 in S643.

After displaying the print information, the main unit CPU 2 determines whether or not it is acceptable to continue the recording operation in S644. The main unit CPU 2 determines whether or not to continue the recording operation based on information such as an instruction to continue the recording operation, an instruction not to perform recording, or an instruction to prioritize printing.

If it is acceptable to continue the recording operation in S644, the main unit CPU 2 continues the current recording operation in S645. The main unit CPU 2 accepts the request for printing either after finishing printing or concurrently with the recording operation, performs the printing operation, and finishes the image processing in S646.

If it is not acceptable to continue the recording operation in S644, the main unit CPU 2 interrupts the current recording operation in S647 and accepts the request for printing. After performing the printing operation, the main unit CPU 2 finishes the image processing in S648.

If it is configured that the recording operation is interrupted and the printing operation is prioritized in S644, the main unit CPU 2 interrupts the current recording operation in S649, accepts the request for printing, and performs the printing operation in S650. After finishing printing, the main unit CPU 2 reports that the printing operation has been finished by displaying a message about that on the display unit 17 in S651. If the user inputs his/her voice using the microphone 20 in accordance with the notification on the end of the printing operation, the main unit CPU resumes the recording operation that records the audio. After recording for the configured time, the main unit CPU 2 finishes the recording operation and finishes the image processing in S652. That is, after configuring timing of performing the recording operation during the recording operation by using the control panel 6 (a timing configuration unit), if the recording operation is requested during the recording operation, the main unit CPU 2 interrupts the recording operation temporarily based on the configured timing of performing and performs the recording operation, or the main unit CPU 2 performs the recording operation after finishing the recording operation.

As described above, the multifunction peripheral 1 further includes the sound output unit 14 and the display unit 17 etc. as a reporting unit that reports information. If there is a waiting recording operation during the recording operation using the microphone 20, the main unit CPU 2 instructs the reporting unit to report information on the waiting recording operation.

Consequently, since it is possible to know the information on the waiting recording operation (information a print job) during the recording operation, it is possible to digitize audio ensuring audio clarity, improving usability.

The multifunction peripheral 1 in this embodiment further includes the control panel 6 (a timing configuration unit) that configures timing of performing the recording operation during the recording operation. If the recording operation is requested during the recording operation (printing operation), the main unit CPU 2 interrupts the recording operation temporarily based on the configured timing of performing and performs the recording operation, or the main unit CPU 2 performs the recording operation after finishing the recording operation.

Consequently, since it is possible to perform the recording operation in accordance with the timing configured by user operation, it is possible to digitize audio ensuring audio clarity, improving usability.

The multifunction peripheral 1 in this embodiment further includes the microphone 20 (a noise level meter) that measures ambient noise level. The main unit CPU 2 considers the condition that the noise level measured by the microphone 20 is below predetermined level as the recording condition.

Consequently, it is possible to perform the recording operation considering not only the operating noise of the multifunction peripheral 1 but also surrounding environmental noise, and it is possible to digitize audio while ensuring audio clarity.

The multifunction peripheral 1 further includes the control panel 6 (a recording time configuration unit) that configures the recording time using the microphone 20, and the main unit CPU 2 performs the recording operation using the microphone 20 only for the recording time configured by using the control panel 6 as the recording time configuration unit 6.

Consequently, it is possible to perform the recording operation when the recording condition that it is possible to record clearly is satisfied, and it is possible to digitize audio ensuring clarity of audio and effectiveness of the image processing operation.

Fourth Embodiment

Figure 14:
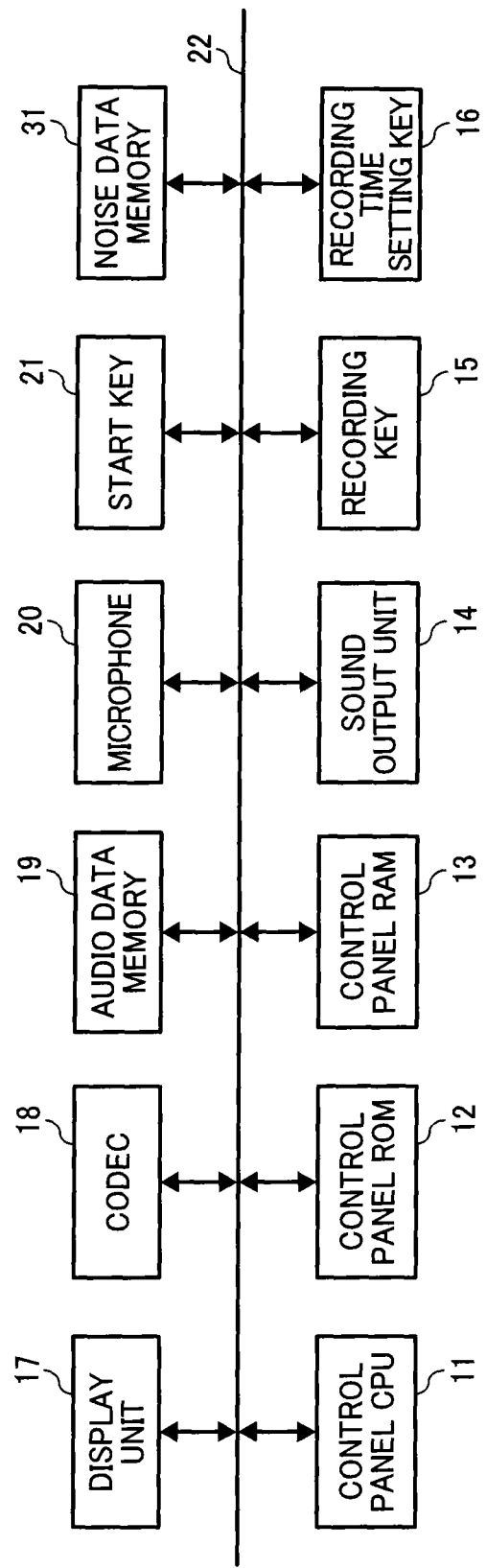
FIG. 14 is a block diagram of a control panel in a multifunction peripheral as a fourth embodiment of the present invention.
Figure 15:
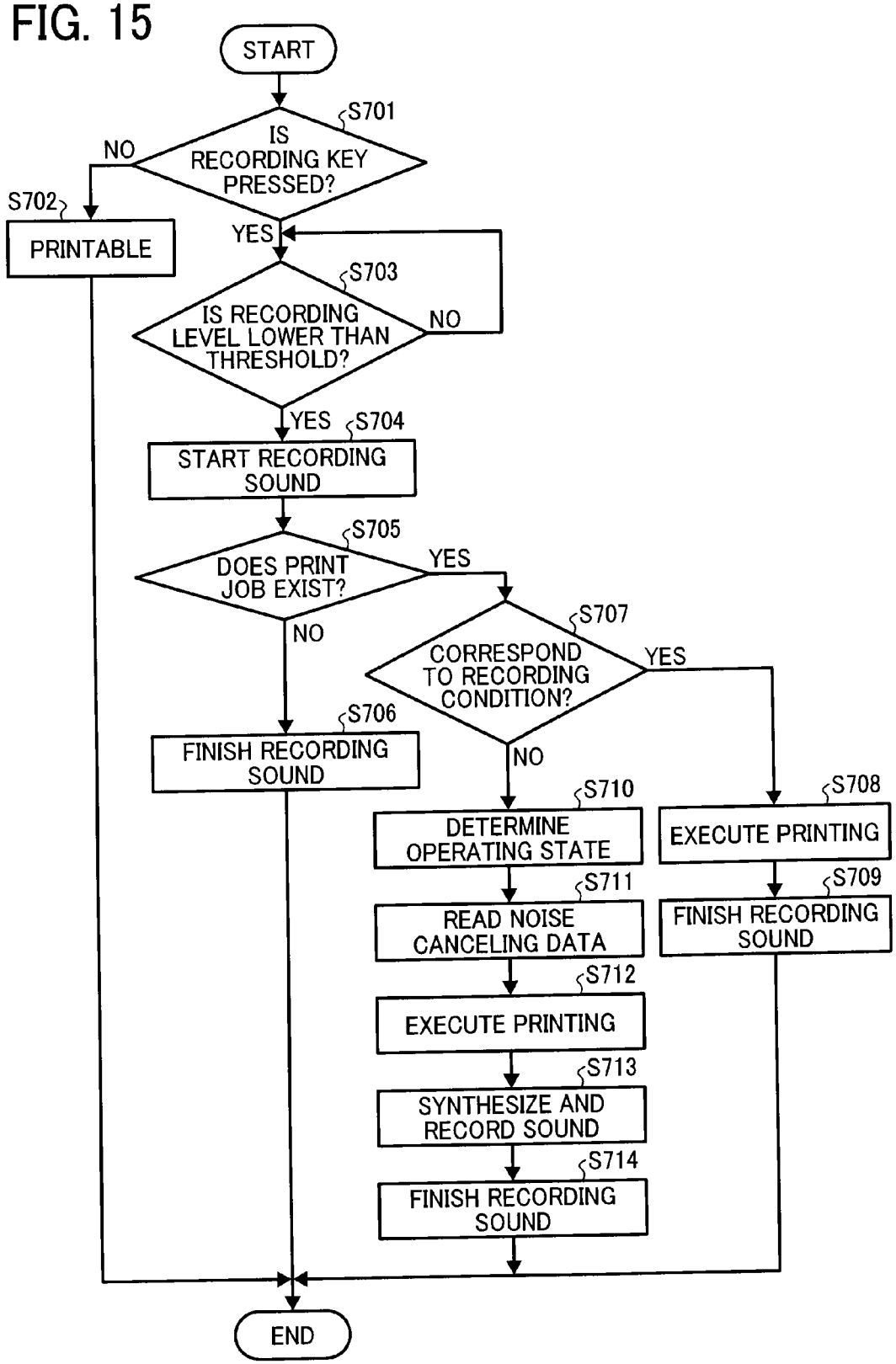
FIG. 15 is a flowchart illustrating an image processing that simultaneously controls recording and printing while noise canceling is performed as the fourth embodiment of the present invention.

A fourth embodiment of the present invention is described below with reference to FIGS. 14 and 15. FIG. 14 is a block diagram of a control panel 30 in the multifunction peripheral 1 in the fourth embodiment. FIG. 15 is a flowchart illustrating an image processing that simultaneously controls recording and printing while noise canceling is performed as the fourth embodiment.

The fourth embodiment is applied to a multifunction peripheral similar to the multifunction peripheral 1 in the first embodiment described above, and regarding not only the main unit of the multifunction peripheral 1 but also the control panel 30, the same reference symbols as in the first embodiment are used in the description below.

While not shown in figures, the multifunction peripheral 1 in this embodiment includes the main unit CPU 2, the main unit ROM 3, the main unit RAM 4, the printer unit 5, the scanner 7, the image memory 8, and the LAN I/F 9 etc. just like the multifunction peripheral 1 in the first embodiment, and the multifunction peripheral 1 in this embodiment further includes the control panel 30.

As shown in FIG. 14, the control panel 30 includes the control panel CPU 11, the control panel ROM 12, the control panel RAM 13, the sound output unit 14, the recording key 15, the recording time setting key 16, the display unit 17, the CODEC 18, the audio data memory 19, the microphone 20, and the start key 21 just like the control panel 6 in the first embodiment, and the control panel 30 in this embodiment further includes a noise data memory 31.

Preliminarily, operating noises in various operating modes (image processing operations) of the multifunction peripheral 1 is collected. The noise data memory 31 (a storage device) stores antiphase sound of those collected operating noises as noise cancelling data. For example, a nonvolatile RAM (NVRAM) is used for the noise data memory 31. In recording audio, the main unit CPU 2 reads the noise cancelling data that corresponds to the current operating mode of the multifunction peripheral 1 from the noise data memory 31 and outputs it to the CODEC 18.

In recording audio, the microphone 20 digitizes outside sound, especially the audio, and output it to the CODEC 18.

By mixing the improving digitized using the microphone 20 with the noise cancelling data from the noise data memory 31, the CODEC 18 reduces and deducts noise from the improving, compresses it, and stores it in the audio data memory 19 as the audio data. Therefore, in inputting improving to the microphone 20 as the recording unit, the main unit CPU 2 and the CODEC 18 functions as an operational noise reduction unit that mixes the antiphase sound corresponding to the image processing operation when the voice is input with the audio data and removes the operational noise from the audio data as a whole.

In the above description, in recording audio, the main unit CPU 2 reads the noise cancelling data corresponding to the operational mode of the multifunction peripheral 1 at that time from the noise data memory 31, outputs it to the CODEC 18, and mixes the audio data with the noise cancelling data. It is possible that not only the main unit CPU 2 but also the control panel CPU 11 can performs this process. In this case, the control panel CPU 11 and the CODEC 18 functions as the operational noise removing unit as a whole, however, the main unit CPU 2 performs the process described above in the below description.

In this embodiment, it is possible to reduce noise from the recorded audio data by mixing the recorded audio data with the antiphase sound of the operational noises preliminarily recorded as the noise cancelling data, and it is possible to perform the recording and printing simultaneously.

That is, as shown in FIG. 15, the main unit CPU 2 checks whether or not the recording key 15 is pressed in order to record attached to the image data of the document scanned by the scanner 7 in S701.

If the recording key is pressed (YES in S701), the main unit CPU 2 digitizes the environmental noise using the microphone 20 and calculates the environmental noise level. The main unit CPU 2 checks whether or not the calculated environmental noise level is below the threshold noise level in S703.

If the environmental noise level exceeds the threshold noise level (NO in S703), the main unit CPU 2 determines that clarity of sound deteriorates in recording audio and continues the scanning operation if the scanning operation has not finished yet without starting recording audio.

If the environmental noise level is below the threshold noise level (YES in S703), the main unit CPU 2 starts the recording operation that records audio using the microphone 20 in S704.

After starting recording audio, the main unit CPU 2 checks whether or not a print job has been issued in S705.

If there is no print job (NO in S705), the main unit CPU 2 continues the recording operation as is. After the recording time elapses, the main unit CPU 2 finishes the recording operation and the image processing in S706.

If there is a print job (YES in S705), the main unit CPU 2 checks whether or not the recording condition is satisfied (the recording condition corresponds) in S707. In the recording condition described above, it is possible to record clearly even if the recording and printing are performed simultaneously. Examples of the recording condition are whether or not duplex printing is performed, whether or not post-processing (e.g., stapling and punching) is performed, and that the noise level is below the predetermined value, etc. That is, in duplex printing, the paper reversal mechanism makes a lot of noise and it is possible that this noise gets mixed in with the recording audio data if the operational noise level exceeds the predetermined level. Therefore, the recording condition is considered as the printing operation whose operational noise level other than duplex printing is below the predetermined level. If post-processing such as stapling and punching is performed and its operational noise level exceeds the predetermined level, the operational noise can affect the recording data. Therefore, in that case, the recording condition is considered as the printing operation whose operational noise level is below the predetermined level without post-processing.

If the recording condition is satisfied (YES in S707), the main unit CPU 2 determines that noise cancelling is not needed, and the main unit CPU 2 continues the recording operation and performs the printing operation in S708. After the recording time elapses, the main unit CPU 2 finishes the recording operation in S709. After finishing the printing operation, the main unit CPU 2 finishes the image processing operation.

If the recording condition is not satisfied (NO in S707), the main unit CPU 2 determines the operational mode of the current printing operation in S710. That is, after checking the print job, the main unit CPU 2 determines whether or not the printing mode is duplex printing mode or the printing mode that contains post-processing etc.

After checking the operating state, the main unit CPU 2 reads the noise cancelling data stored in the noise data memory 31 based on the operating state in S711. Subsequently, the main unit CPU 2 records audio and performs the printing operation (recording operation) simultaneously in S712. The main unit CPU 2 continues digitizing the audio during the printing operation and instructs the CODEC 18 to mix the digitized audio data with the noise cancelling data. The main unit CPU 2 removes noise (operational noise) from the digitized audio data and stores it in the audio data memory 19 in S713. After the recording time elapses, the main unit CPU 2 finishes the recording operation in S714. After finishing the printing operation, the main unit CPU 2 finishes the image processing operation.

In the above description, if the recording condition does not correspond, the operational noise is removed from the recorded sound. However, removing the operational noise is not limited to the case that the recording condition does not correspond. For example, it is possible to remove the operational noise from the recorded sound regardless of the recording condition.

As described above, the multifunction peripheral 1 in this embodiment further includes the noise data memory 31 (a storage device) that stores antiphase sound of operational noises generated in accordance with the image processing operation of the multifunction peripheral 1 as the image processing apparatus for each of the image processing operations preliminarily and the operational noise removing unit such as the main unit CPU 2 and the CODEC 18 etc. that mixes the antiphase sound corresponding to the image processing operation in inputting the voice with the audio data and removes the operational noise from the audio data. The main unit CPU 2 (the data editing unit) adds the audio data from which the operational noise is removed to the image data.

Consequently, even if the operational noise is generated, it is possible to remove the operational noise from the recorded sound, and it is possible to digitize audio ensuring audio clarity and effectiveness of the image processing operation.

Fifth Embodiment

Figure 16:
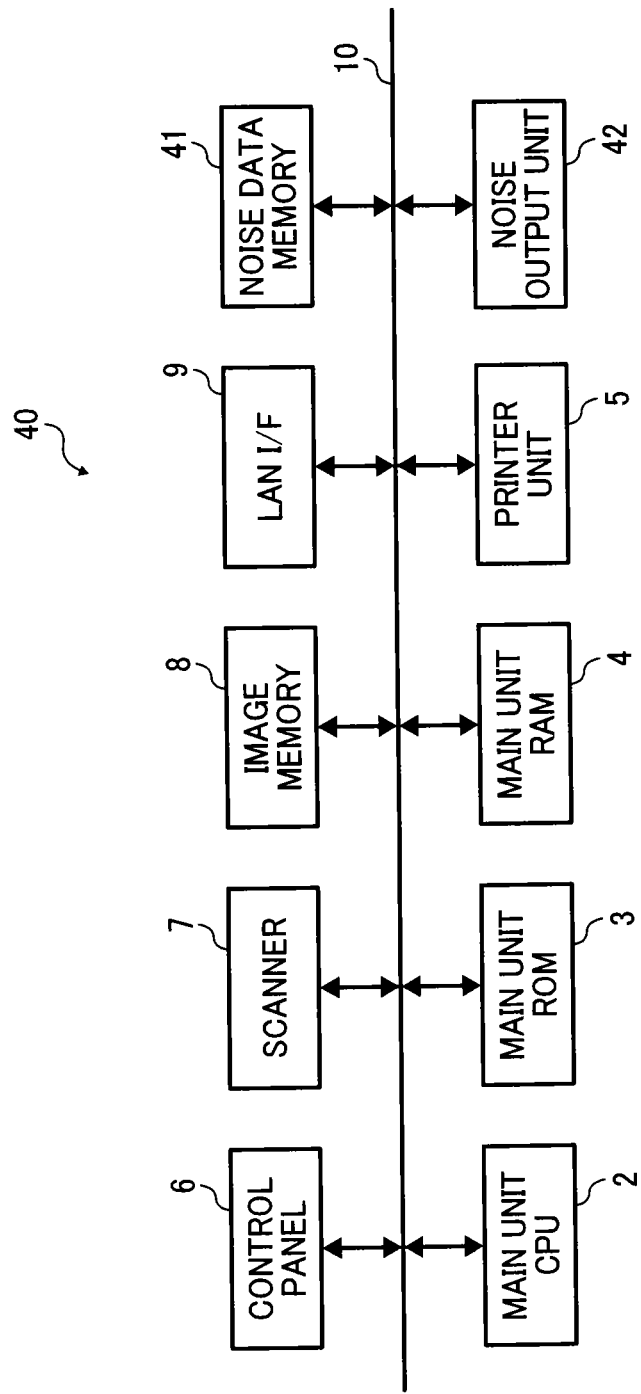
FIG. 16 is a block diagram of a multifunction peripheral as a fifth embodiment of the present invention.

A fifth embodiment of the present invention is described below with reference to FIGS. 16 and 17. FIG. 16 is a block diagram of a multifunction peripheral 40 in the fifth embodiment. FIG. 17 is a flowchart illustrating an image processing that simultaneously controls recording and printing while noise canceling is performed as the fifth embodiment.

The fifth embodiment is applied to a multifunction peripheral similar to the multifunction peripheral 1 in the first embodiment described above, and the same reference symbols as the multifunction peripheral in the first embodiment are used in the description below. Descriptions of those reference symbols is simplified or omitted.

As shown in FIG. 16, the multifunction peripheral 40 in this embodiment includes the main unit CPU 2, the main unit ROM 3, the main unit RAM 4, the printer unit 5, the scanner 7, the image memory 8, and the LAN I/F 9 etc. just like the multifunction peripheral 1 in the first embodiment, and the multifunction peripheral 40 in this embodiment further includes a noise data memory 41 and a noise output unit 42.

Operational noise in various operational modes of the multifunction peripheral 40 is digitized, and antiphase sound of the digitized operational noise is stored in the noise data memory 41 (a storage device) preliminarily. For example, a nonvolatile RAM (NVRAM) is used for the noise data memory 41.

For example, a speaker etc. is used for the noise output unit 42 (a sound output unit). Under the control of the main unit CPU 2, the noise output unit 42 outputs noise cancelling sound based on the noise cancelling data corresponding to the operational mode (image processing operation) among noise cancelling data stored in the noise data memory 41.

The multifunction peripheral 40 in this embodiment records sound outputting the noise cancelling sound corresponding to the operational mode of the multifunction peripheral 40.

That is, as shown in FIG. 17, the main unit CPU 2 checks whether or not the recording key 15 is pressed in order to record attached to the image data of the document scanned by the scanner 7 in S801.

If the recording key 15 is not pressed (NO in S801), the main unit CPU 2 considers that it is possible to perform printing (the recording operation) using the printer unit 5 and finishes the image processing in S802.

If the recording key is pressed (YES in S801), the main unit CPU 2 digitizes the environmental noise using the microphone 20 and calculates the environmental noise level. The main unit CPU 2 checks whether or not the calculated environmental noise level is below the threshold noise level in S803.

If the environmental noise level exceeds the threshold noise level (NO in S803), the main unit CPU 2 determines that clarity of sound deteriorates in recording audio and checks whether or not the environmental noise level is below the threshold noise level again after predetermined time without starting the recording operation in S803.

If the environmental noise level is below the threshold noise level (YES in S803), the main unit CPU 2 starts the recording operation that records audio using the microphone 20 in S804.

After starting recording audio, the main unit CPU 2 checks whether or not a print job has been issued in S805.

If there is no print job (NO in S805), the main unit CPU 2 continues the recording operation as is. After the recording time elapses, the main unit CPU 2 finishes the recording operation and the image processing in S806.

If there is a print job (YES in S805), the main unit CPU 2 checks whether or not the recording condition is satisfied (the recording condition corresponds) in S807. The recording condition is similar to the recording condition in the fourth embodiment. That is, in the recording condition described above, it is possible to record clearly even if the recording and printing is performed simultaneously. Examples of the recording condition are whether or not duplex printing is performed, whether or not post-processing (e.g., stapling and punching) is performed, and that the noise level is below the predetermined value, etc.

If the recording condition is satisfied (YES in S807), the main unit CPU 2 determines that noise cancelling is not needed, and the main unit CPU 2 continues the recording operation and performs the printing operation in S808. After the recording time elapses, the main unit CPU 2 finishes the recording operation in S809. After finishing the printing operation, the main unit CPU 2 finishes the image processing operation.

If the recording condition is not satisfied (NO in S807), the main unit CPU 2 determines the operational mode of the current printing operation in S810. That is, after checking the print job, the main unit CPU 2 determines whether or not the printing mode is duplex printing mode or the printing mode that contains post-processing etc.

After determining the operational mode (the image processing operation), the main unit CPU 2 reads the noise cancelling data stored in the noise data memory 41 based on the operational mode in S811. The main unit CPU 2 transfers the read noise cancelling data to the noise output unit 42 and instructs the noise output unit 42 to output the noise cancelling data as the noise cancelling sound in S812.

It is possible to cancel the operational noise generated as the multifunction peripheral 40 operates by outputting the noise cancelling sound through the noise output unit 42, and it is possible to prevent the operational noise from getting mixed in the audio data digitized through the microphone 20 as noise.

The main unit CPU 2 performs the recording operation described above and the printing operation (recording operation) concurrently in S813. That is, the main unit CPU 2 digitizes audio whose noise is cancelled using the noise cancelling sound during the printing operation. The main unit CPU 2 converts the digitized audio data into digital data such as WAV and MP3 using the CODEC 18 and stores it in the audio data memory 19.

After the recording time elapses, the main unit CPU 2 finishes the recording operation in S814. After finishing the printing operation, the main unit CPU 2 finishes the image processing operation.

In the above description, if the recording condition does not correspond, the operational noise is removed from the recorded sound. However, removing the operational noise is not limited to the case that the recording condition does not correspond. For example, it is possible to remove the operational noise from the recorded sound regardless of the recording condition.

As described above, the multifunction peripheral 40 in this embodiment further includes the noise data memory 41 (a storage device) that stores that stores antiphase sound of operational noises generated as the multifunction peripheral 40 performs the image processing operation for each of the image processing operations preliminarily, the noise output unit 42 (a sound output unit) that outputs the antiphase sound read from the noise data memory 41, and the main unit CPU 2 (an operational noise remover) that removes the operational noise from the sound input through the microphone 20 by outputting the antiphase sound in accordance with the image processing operation in inputting the sound using the noise output unit 42. The main unit CPU 2 (the data editing unit) adds the audio data that the microphone 20 stores in the audio data memory 19 to the image data.

Consequently, even if the operational noise is generated, it is possible to remove the operational noise from the recorded sound, and it is possible to digitize audio ensuring audio clarity and effectiveness of the image processing operation.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

What is claimed is:

1. An image processing apparatus, comprising:
    an audio recording unit to store audio data based on input audio in an audio storage device;
    a data editing unit to add the audio data to image data;
    control circuitry to instruct the audio recording unit to record when a predetermined recording condition is satisfied;
    a scanner to scan an image on a document and output the image data, wherein the control circuitry instructs the scanner to scan the document and the recording unit to record the audio simultaneously when the predetermined recording condition is satisfied;
    an automatic document feeder to transfer sheets of a document set placed on a document tray, one sheet by one sheet, to the scanner;
    a document detector to detect the number of sheets of the document set on the document tray; and
    a reporting unit to report a waiting time,
    wherein the control circuitry calculates waiting time until the recording unit can record the audio after the scanner scans the document set on the document tray based on the number of sheets of the document that the document detector detects and instructs the reporting unit to output the waiting time.

2. The image processing apparatus according to claim 1, further comprising a recording time configuration unit to configure a recording time during which the audio recording unit records the audio,
    wherein the control circuitry instructs the audio recording unit to record the audio for the recording time configured by the recording time configuration unit.

3. The image processing apparatus according to claim 1, further comprising a recording condition configuration unit to configure the predetermined recording condition,
    wherein the control circuitry controls instructing the recording unit to record the audio based on the predetermined recording condition configured by the recording condition configuration unit.

4. An image processing apparatus, comprising:
    an audio recording unit to store audio data based on input audio in an audio storage device;
    a data editing unit to add the audio data to image data;
    control circuitry to instruct the recording unit to record when a predetermined recording condition is satisfied;
    a scanner to scan an image on a document and output the image data, wherein the control circuitry instructs the scanner to scan the document and the audio recording unit to record the audio simultaneously when the predetermined recording condition is satisfied; and
    an image recording unit to record an image on a recording medium,
    wherein the control circuitry instructs the image recording unit to record the image and the audio recording unit to record the audio simultaneously when the predetermined recording condition is satisfied, and the control circuitry instructs the image recording unit to record the image and the audio recording unit to record the audio sequentially when the predetermined recording condition is not satisfied.

5. The image processing apparatus according to claim 4, wherein the control circuitry instructs the image recording unit to record the image and instructs the audio recording unit to record the audio sequentially, when the image processing apparatus receives a request to record the audio using the audio recording unit while the image recording unit records the image or a request to record the image using the image recording unit while the audio recording unit records the audio, and when the predetermined recording condition is not satisfied.

6. The image processing apparatus according to claim 4, wherein the predetermined recording condition includes a condition in which a level of operational noise of the recording unit is below a predetermined threshold volume.

7. The image processing apparatus according to claim 4, further comprising a reporting unit,
   wherein the control circuitry instructs the reporting unit to output information on a waiting recording operation if there is a recording operation on pause while the audio recording unit records the audio.

8. The image processing apparatus according to claim 4, further comprising a timing configuration unit to configure timing of recording the audio while the image recording unit records the image,
   wherein the control circuitry instructs the image recording unit to stop recording the image temporarily and instructs the audio recording unit to record the audio or the control circuitry instructs the audio recording unit to record the audio after the image recording unit finishes recording the image based on the timing of recording the audio if is the image processing apparatus is requested to record the audio while the image recording unit records the image.

9. The image processing apparatus according to claim 1, further comprising a noise level meter to measure a level of ambient noise,
   wherein the predetermined recording condition includes a condition in which a level of the noise as measured by the noise level meter is below a predetermined threshold level.

10. The image processing apparatus according to claim 9, further comprising:
    a storage device to store antiphase audio of operational noise generated in accordance with an image processing operation of the image processing apparatus for each image processing operation preliminarily; and
    an operational noise remover to synthesize the antiphase audio corresponding to the image processing operation in inputting the audio with the audio data and removes the operational noise from the audio data,
    wherein the data editing unit adds the audio data that the operational noise is removed to the image data.

11. The image processing apparatus according to claim 9, further comprising:
    a storage device to store antiphase audio of operational noise generated by the image processing apparatus for each image processing operation;
    an audio output unit to output the antiphase audio read from the storage device; and
    an operational noise remover to remove the operational noise from the audio input through the recording unit by outputting the antiphase audio in inputting the audio using the audio output unit.

12. A method of processing an image, the method comprising the steps of:
    storing, by an audio recording unit, audio data based on input audio in a memory, using an audio recording unit;
    adding the audio data to image data;
    instructing the audio recording unit to record when a predetermined recording condition is satisfied;
    scanning, by a scanner, an image on a document and outputting the image data, wherein the instructing step comprises instructing the scanner to scan the document and the recording unit to record the audio simultaneously when the predetermined recording condition is satisfied; and
    recording an image on a recording medium,
    wherein the instructing step comprises instructing the image recording unit to record the image and the audio recording unit to record the audio simultaneously when the predetermined recording condition is satisfied, and instructing the image recording unit to record the image and the audio recording unit to record the audio sequentially when the predetermined recording condition is not satisfied.

13. A non-transitory, computer-readable recording medium storing a program that, when executed by a processor, causes the processor to implement a method of processing an image, the method comprising the steps of:
    storing, by an audio recording unit, audio data based on input audio in a memory, using an audio recording unit;
    adding the audio data to image data;
    instructing the audio recording unit to record when a predetermined recording condition is satisfied;
    scanning, by a scanner, an image on a document and outputting the image data, wherein the instructing step comprises instructing the scanner to scan the document and the recording unit to record the audio simultaneously when the predetermined recording condition is satisfied; and
    recording an image on a recording medium,
    wherein the instructing step comprises instructing the image recording unit to record the image and the audio recording unit to record the audio simultaneously when the predetermined recording condition is satisfied, and instructing the image recording unit to record the image and the audio recording unit to record the audio sequentially when the predetermined recording condition is not satisfied.

* * * * *